United States Patent
Innes et al.

(10) Patent No.: US 7,982,951 B1
(45) Date of Patent: Jul. 19, 2011

(54) DIGITAL TRACKING PLATFORM FOR TELESCOPES

(76) Inventors: Robert Innes, Sebastopol, CA (US); Stephen LeRoy Bursch, Sebastopol, CA (US)

( * ) Notice: Subject to any disclaimer, the term of this patent is extended or adjusted under 35 U.S.C. 154(b) by 0 days.

(21) Appl. No.: 12/927,185

(22) Filed: Nov. 8, 2010

(51) Int. Cl.
  *G02B 23/16* (2006.01)
(52) U.S. Cl. .................................... 359/430; 359/429
(58) Field of Classification Search .............. 359/429, 359/430
  See application file for complete search history.

(56) References Cited

U.S. PATENT DOCUMENTS

| | | | |
|---|---|---|---|
| 4,666,362 | A | 5/1987 | Landsberger et al. |
| 4,732,525 | A | 3/1988 | Neumann |
| 5,271,592 | A | 12/1993 | Ludwig |
| 5,740,699 | A | 4/1998 | Ballantyne et al. |
| 6,336,375 | B1 | 1/2002 | McMurtry et al. |
| 6,354,168 | B1 | 3/2002 | Schwaar et al. |
| 6,477,912 | B2 | 11/2002 | Song et al. |
| 7,035,005 | B2 | 4/2006 | Johnson |
| 7,388,700 | B1 | 6/2008 | Odhner |

FOREIGN PATENT DOCUMENTS

| EP | 0266026 A1 | 5/1988 |
|---|---|---|
| EP | 0515888 A1 | 12/1992 |

OTHER PUBLICATIONS

Wikipedia demonstration of "Stewart platform", 2010.
Google "Radio telescope hexpod", 2010.

*Primary Examiner* — Joshua L Pritchett

(57) ABSTRACT

A digitally controlled platform for precise celestial tracking of astronomical telescopes, generally those having an independent pointing mechanism. A movable stage carrying the telescope is moved relative to a base by three digitally controlled actuators each of which determines the distance between a point fixed in the base and a point fixed stage. The base and stage otherwise are connected by a mechanism that holds a single point fixed in the base in coincidence with a single point fixed in the stage. It functions without approximation at any digitally specified latitude and longitude, enabling astrophotography with alt/azimuth mounted telescopes and diurnal tracking through the zenith. The digital controller may be a personal computer laptop running a multitasking operating system linked to the platform electronics by a Universal Serial Bus cable. Novel software design allows precise tracking, control, and calibration in spite of operating system and Universal Serial Bus latency.

8 Claims, 19 Drawing Sheets

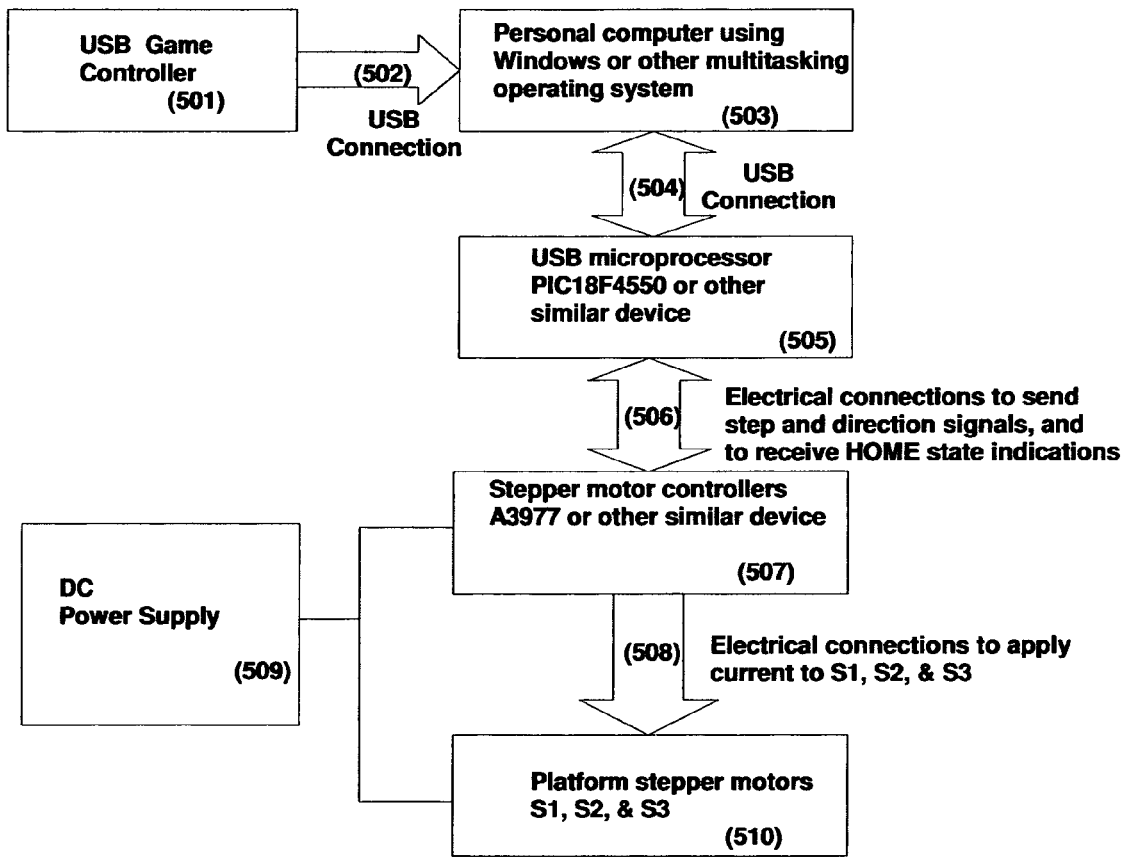
Fig. 5 Block Diagram of System Components

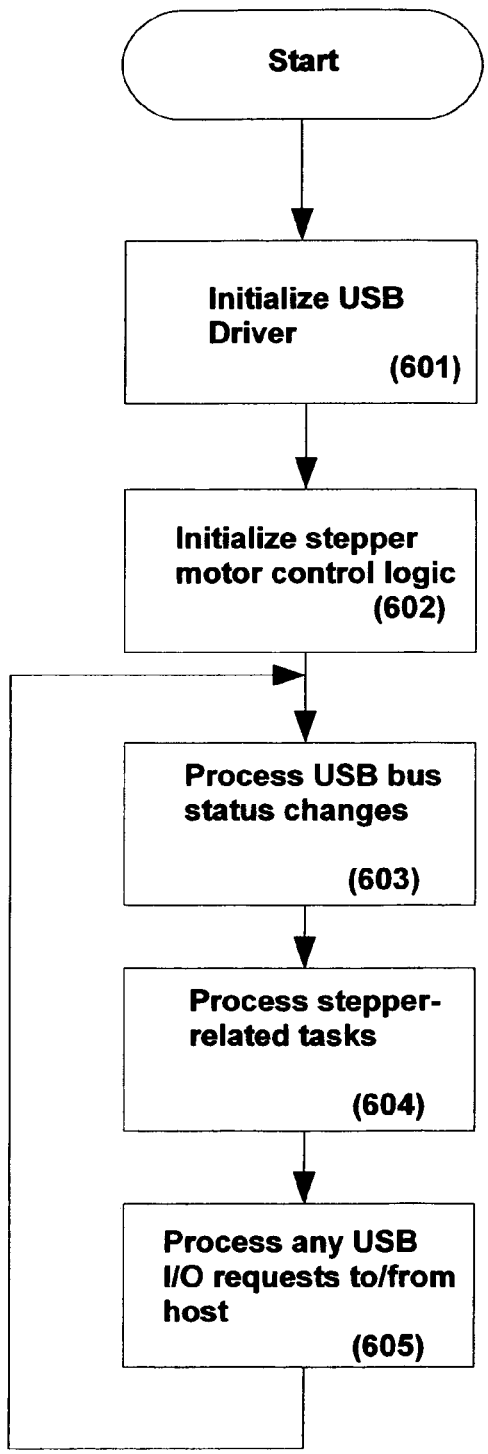
Fig. 6 Software Flowchart

Stepper Motor Control Logic Initialization
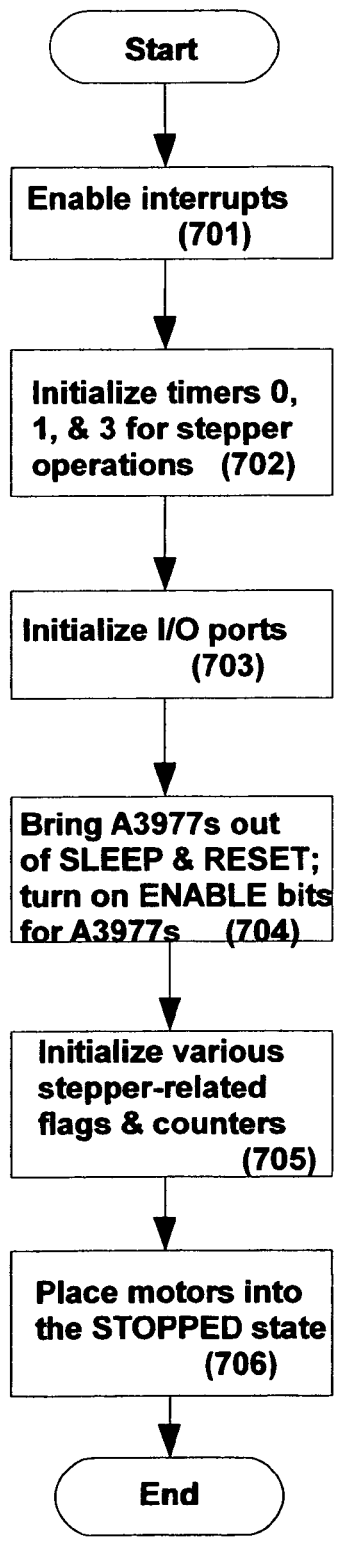
Fig. 7 Software Flowchart

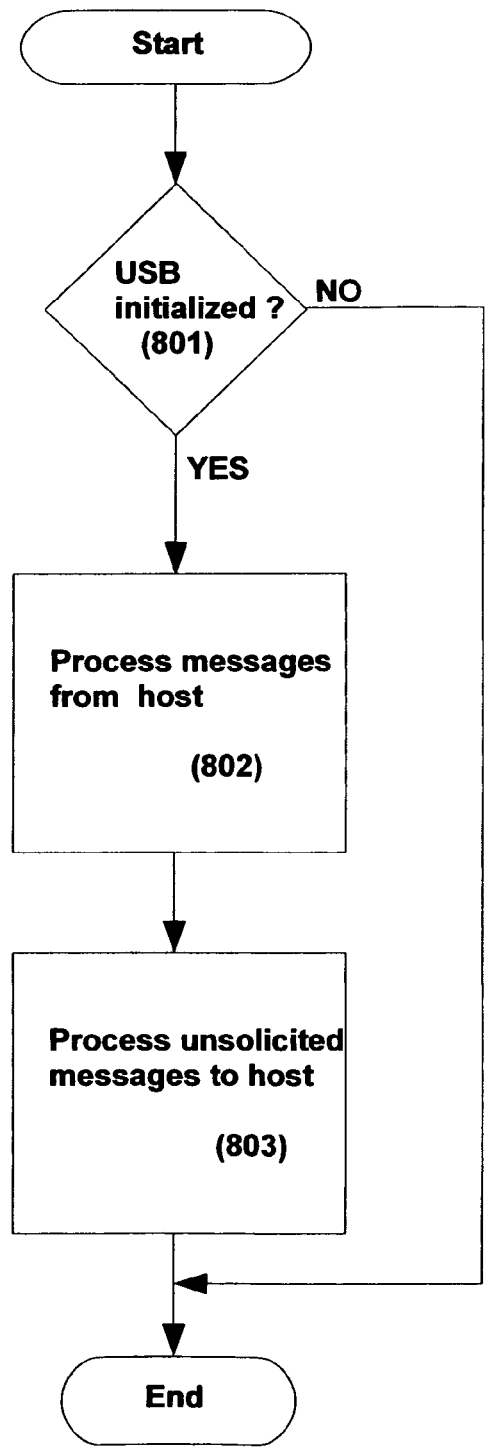
Fig. 8 Software Flowchart

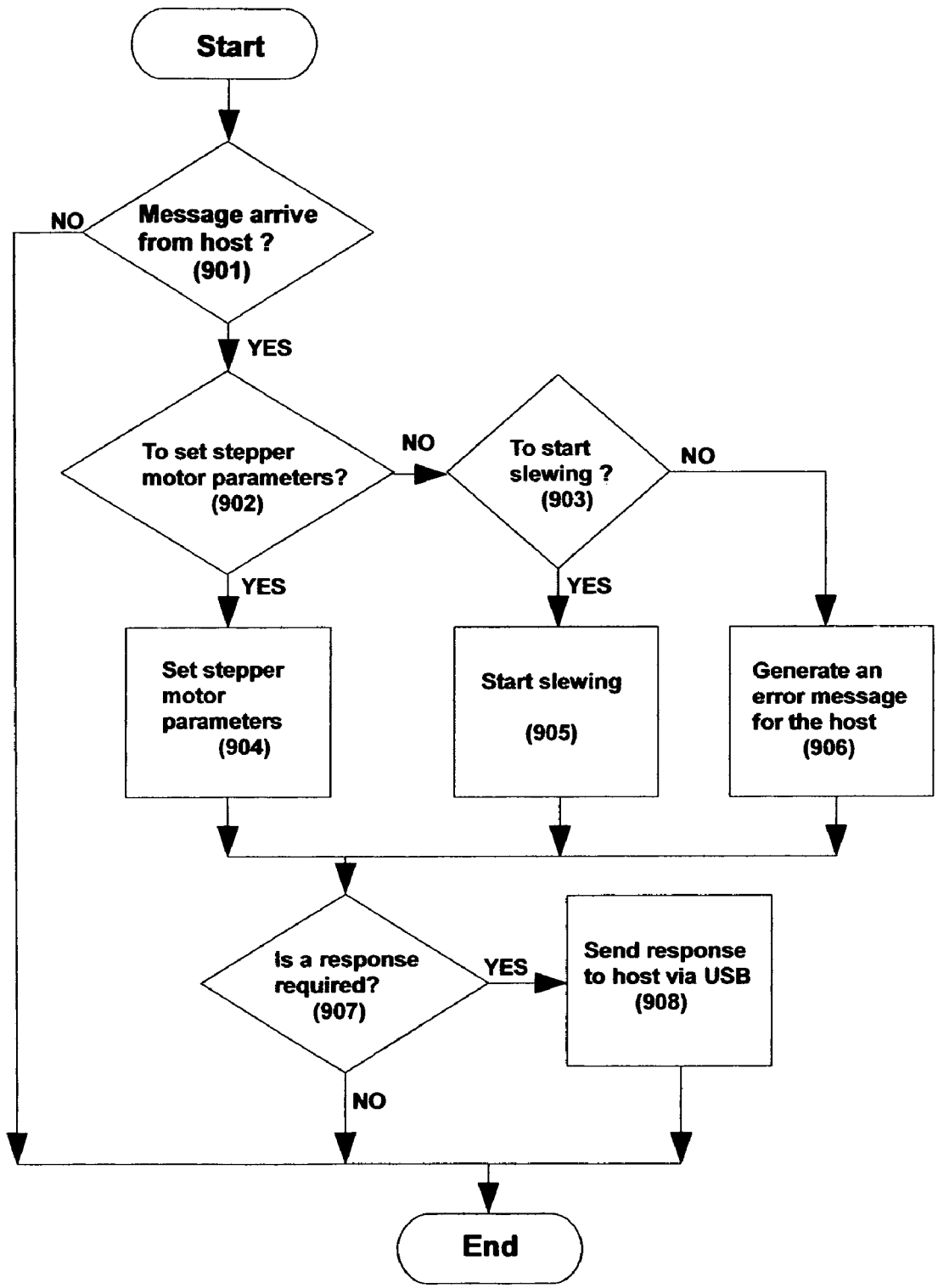
Fig. 9 Software Flowchart

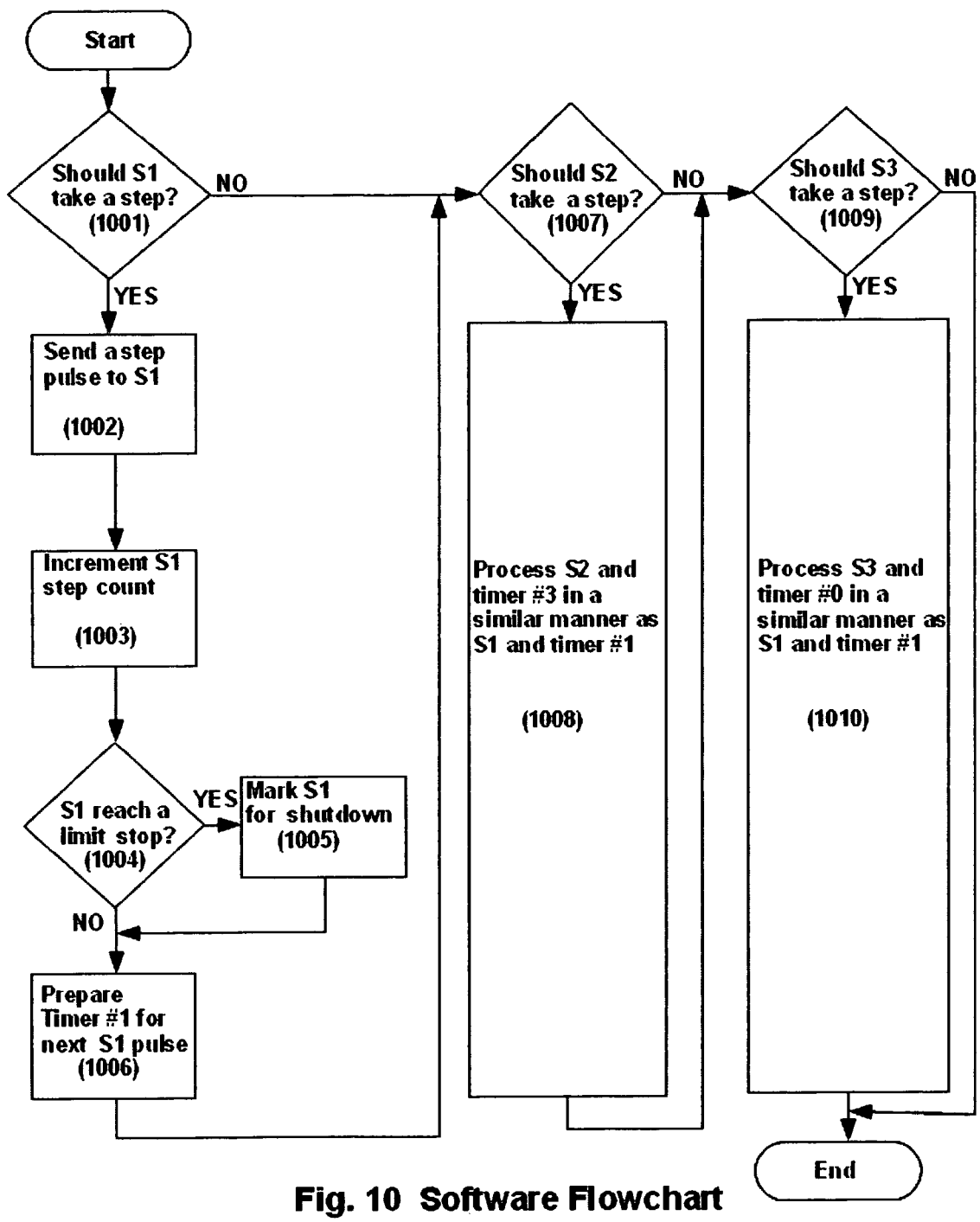
Fig. 10 Software Flowchart

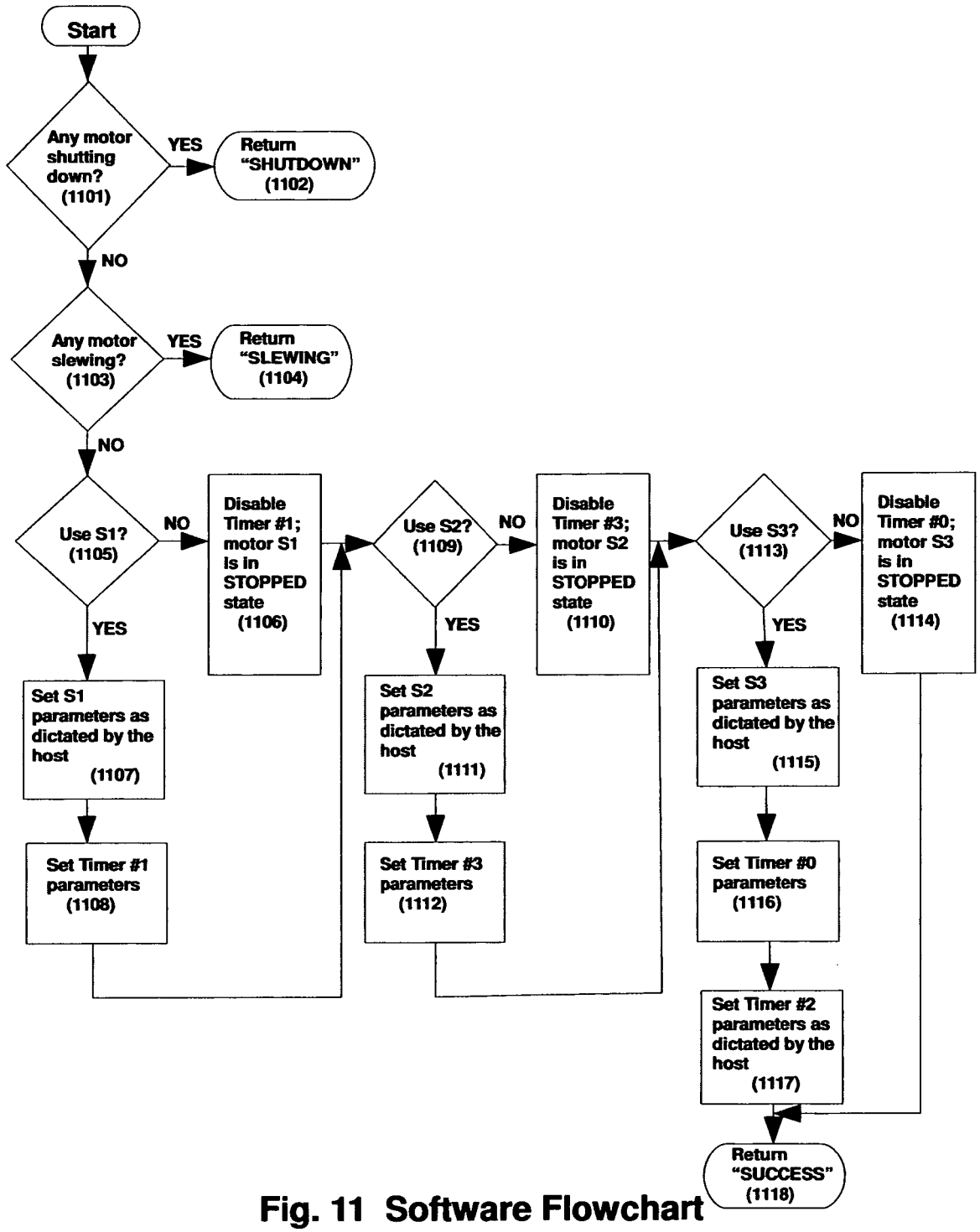
Fig. 11 Software Flowchart

Process Unsolicited Message to Host
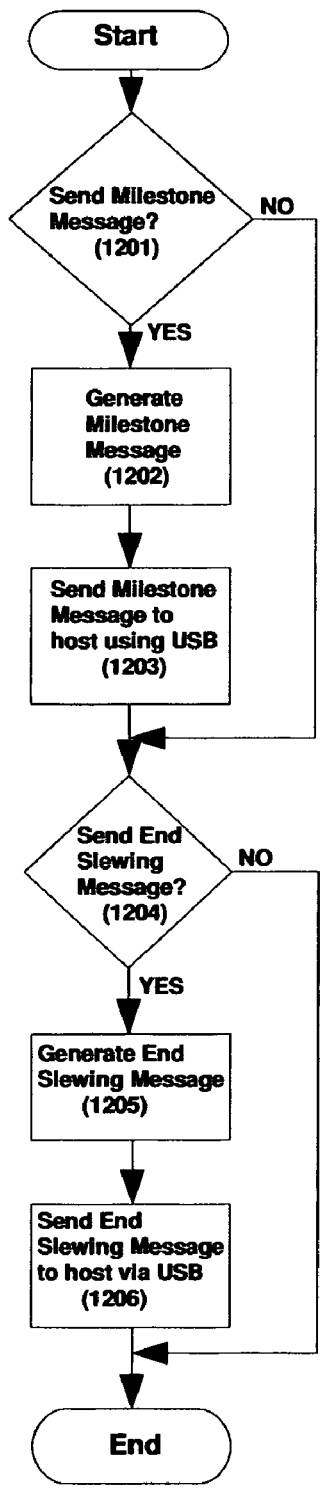
Fig. 12 Software Flowchart

Start Slewing
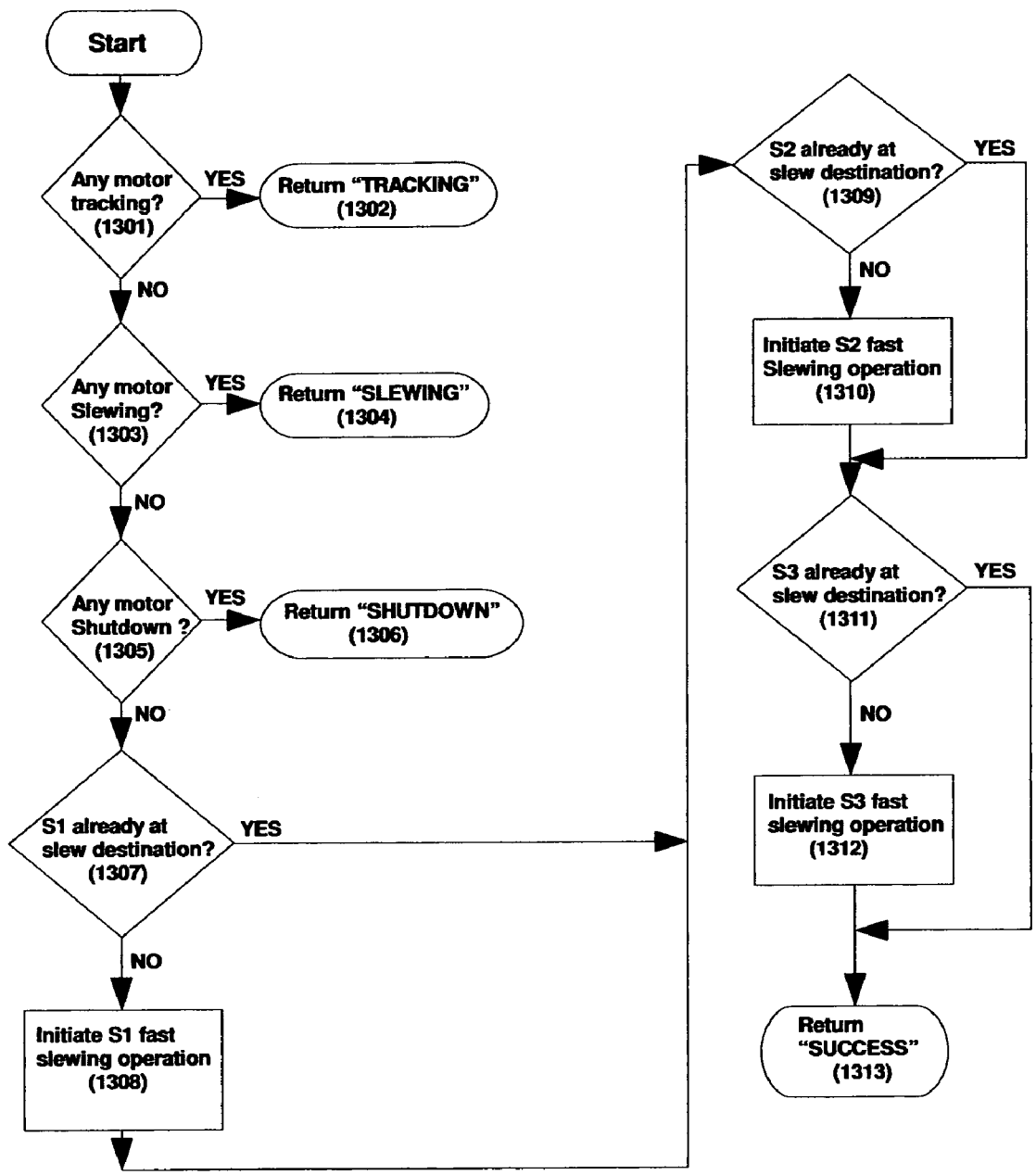
Fig. 13 Software Flowchart

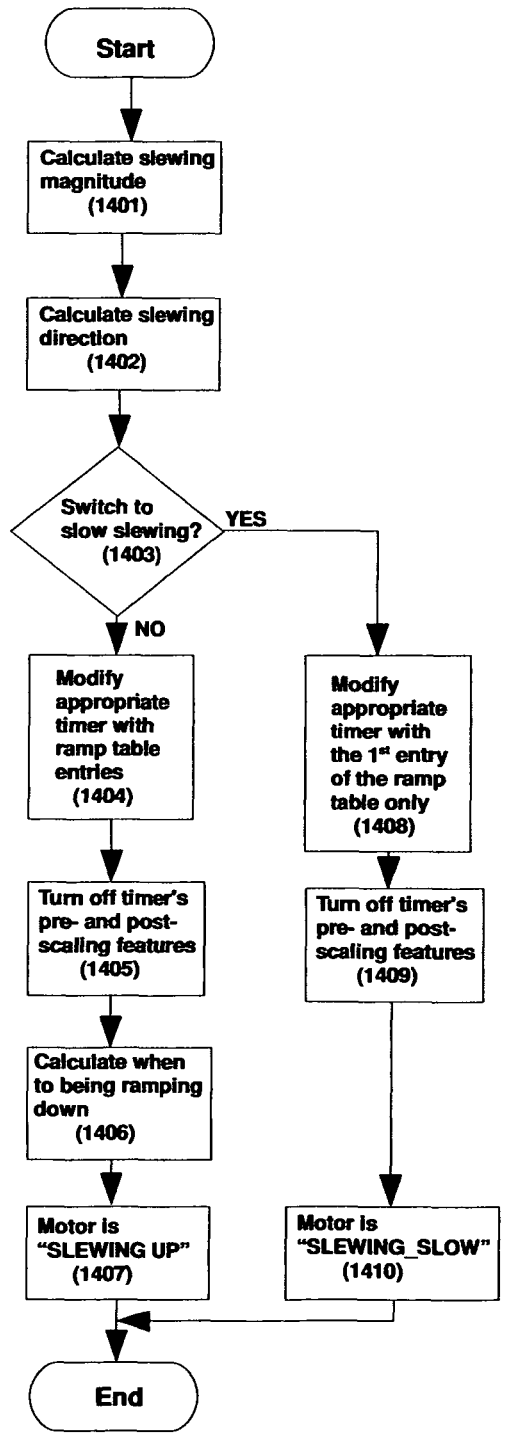
Fig. 14 Software Flowchart

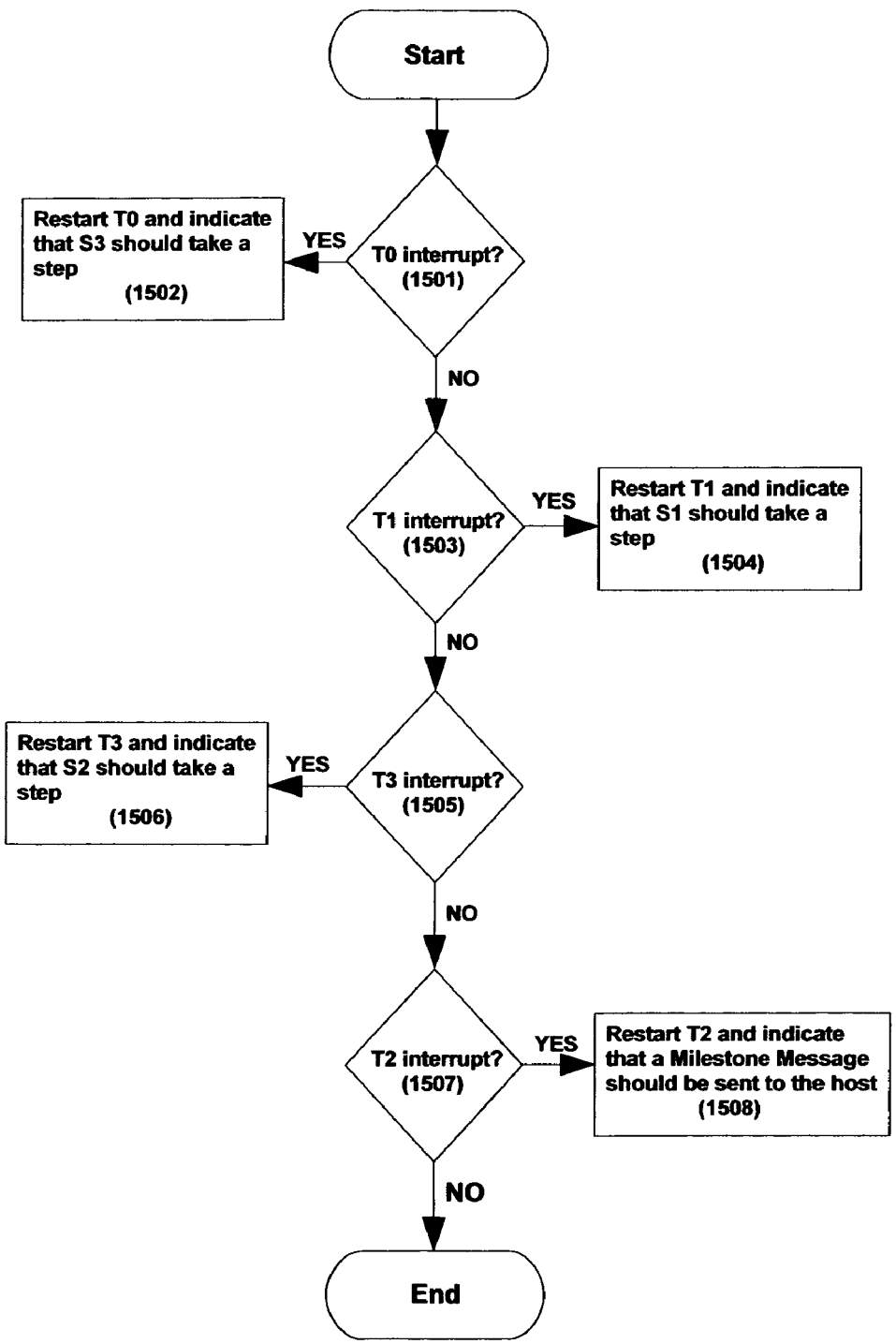
Fig. 15 Software Flowchart

| t | Count | $1^{st}$ difference | $2^{nd}$ difference | $3^{rd}$ difference |
|---|---|---|---|---|
| 0 | $c_0$ | $c_1-c_0 = d'_0$ | $d'_1-d'_0 = d''_0$ | $d''_1-d''_0 = d'''_0$ |
| 1 | $c_1$ | $c_2-c_1 = d'_1$ | $d'_2-d'_1 = d''_1$ | $d'''_0$ |
| 2 | $c_2$ | $c_3-c_2 = d'_2$ | | $d'''_0$ |
| 3 | $c_3$ | | | $d'''_0$ |
| 4 | $c_4$ | | | $d'''_0$ |
| 5 | $c_5$ | | | $d'''_0$ |
| 6 | $c_6$ | | | $d'''_0$ |
| 7 | $c_7$ | | | $d'''_0$ |

Table A

| t | Count | $1^{st}$ difference | $2^{nd}$ difference | $3^{rd}$ difference |
|---|---|---|---|---|
| 0 | $c_0$ | $c_1-c_0 = d'_0$ | $d'_1-d'_0 = d''_0$ | $d''_1-d''_0 = d'''_0$ |
| 1 | $c_1$ | $c_2-c_1 = d'_1$ | $d'_2-d'_1 = d''_1$ | $d'''_0$ |
| 2 | $c_2$ | $c_3-c_2 = d'_2$ | $d''_2 = d''_1+d'''_0$ | $d'''_0$ |
| 3 | $c_3$ | $d'_3 = d'_2+d''_2$ | | $d'''_0$ |
| 4 | $c_4 = c_3+d'_3$ | | | $d'''_0$ |
| 5 | $c_5$ | | | $d'''_0$ |
| 6 | $c_6$ | | | $d'''_0$ |
| 7 | $c_7$ | | | $d'''_0$ |

Table B

| $c_0$ | $d'_0$ | $d''_0$ | $d'''_0$ | S |
|---|---|---|---|---|

Table C

Figure 16

$$|S_1||P\sim||A||q_1| - |S_2||P\sim||A||q_2| = |0|$$

- Where $|P\sim|$ is the inverse of the matrix relating the level stage to the base coordinates
- $|S_1|$ and $|S_2|$ are matrices computable form the actuator lengths when the telescope is pointed at stars 1 and 2
- $|q_1|$, $|q_2|$ are vectors computable from the known *apparent star positions* stars 1 and 2.

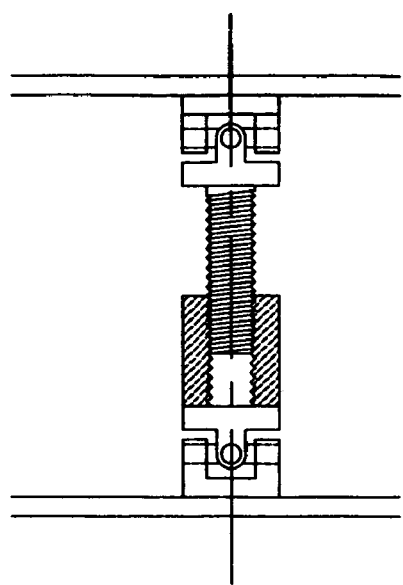
18A
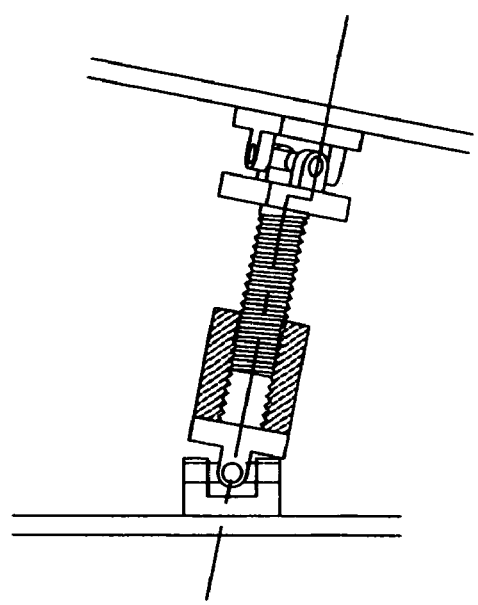
18B
Figure 18

DIGITAL TRACKING PLATFORM FOR TELESCOPES

REFERENCES

Google: telescope radio hexapod
Wikipedia: Stewart Platform
Spherical Astronomy (W. M. Smart 1947)
Spherical Astronomy (Green 1985)
U.S. Naval Observatory Circular 179
The Astronomical Almanac (U.S. Naval Observatory)
Numerical Recipes (Press, Teukolsky, Vetterling, Flannery)

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING CD ROM

Not applicable

GLOSSARY Please refer here for the definitions of technical terms printed in italics, that are not otherwise defined in context.

Names given to components of the mechanism of FIG. 1 and its embodiments, in the interests of brevity, are printed in bold type when they refer to components of that mechanism. These terms are defined hereafter on their first occurrence and are base
stage
actuator
anchor-point The following three terms are defined under DETAILED DESCRIPTION OF THE DIGITAL CONTROL FUNCTIONS USBmP
host
milestone Apparent position of a star. The direction of light from a star as it enters the telescope. It is computed from the star's catalog position by taking into account many effects such as the orbital velocity of the Earth and atmospheric refraction. Open source software to perform these complex calculations is readily available from the Internet. Star catalogs are similarly available.

Autoguider An aftermarket device sold to amateur astrophotographers, which allow long exposure pictures to be taken with telescopes, and their mounts that track with compromised accuracy, which would otherwise result in blurred pictures.

Altitude an angle measured from the horizon towards the zenith about a horizontal axis.

Azimuth is an angle measured about a vertical axis from some reference direction like true north around the horizon, like the points of a compass.

Altazimuth mount A telescope mount in which the telescope is pointed in any direction by rotation about two mechanical axes one moving in azimuth and the other in altitude where rotations about the axes are analogs of these angles. The fundamental circle of this mount is the horizon.

Buffer is a data memory which stores enough advance data that a device requiring timely data can fetch it from the buffer at the moment it is needed. The loading must stay safely ahead of the fetching without getting so far ahead that the buffer overflows.

Celestial equator Imaginary circle formed by projecting the Earth's equator onto the sky.

Celestial pole The point in the sky pointed at by the axis of rotation of the Earth. May refer to either the north celestial pole or the south celestial pole.

Declination An angle in the sky measured from the celestial equator towards either celestial pole, positive north.

Diurnal motion The apparent motion of celestial bodies caused by the rotation of the Earth. The principal service of tracking mounts for telescopes is to neutralize this motion.

Dobsonian An inexpensive altazimuth mount used by amateur astronomers for large reflecting telescopes.

Ephemeris. A table of data giving the position as a function of the time of an astronomical object with respect to stars and galaxies. May be machine readable or given as an algorithm for computing the table. Pl: ephemeredes.

Equatorial mount A telescope mount in which the telescope can be pointed in any direction by rotation about two mechanical axes one moving in hour angle and the other in declination where rotations about the axes are analogs of these angles. The fundamental circle of this mount is the celestial equator. The hour or polar axis is parallel within alignment accuracy to the polar axis of rotation of the Earth. The declination axis, within construction accuracy, is orthogonal to the hour axis; ideally it lies somewhere in a plane parallel to the equatorial plane of the Earth. The purpose of this mount is to compensate for the rotation of the Earth by rotating the telescope about a single axis, namely the hour axis, at a uniform rate.

Euler angles Angles describing the relative orientation of frames of reference. Because three Euler angles generally are needed, a rigid body is said to have three Eulerian angular degrees of freedom.

Finder A small wide field telescope attached to a main telescope to facilitate pointing the main telescope at a desired object when the finder crosshairs are centered on the object.

GPS Global Positioning System. A space-based satellite system that provides accurate location and time information anywhere and at any time on or near the Earth, which information is retrievable by a single relatively inexpensive microelectronic device.

Horizon The circle in the sky defined by a plane that is level at the telescope site.

Hour angle An angle in the sky measured along the celestial equator from its intersection with the meridian, positive when measured to the west. The axis of hour angle is called the hour or polar axis and is parallel to the axis of rotation of the Earth. Like the alt/azimuth system, hour angle/declination is Earth referenced.

Longitude and latitude, geodetic, of the observing site are needed to be supplied digitally to the computer controlling the stage motion. Geodetic means that a spirit level determines the horizon, a plumb line defines the vertical, which does not in general point exactly at the center of the Earth due to the planet's oblateness caused by its rotation.

Latency Non-instantaneous response in the machine processing of information. Usually refers to delay that is sufficiently significant and unpredictable that a priory it cannot be determined with adequate accuracy.

Meridian Imaginary circle on the sky from true north through the zenith to true south.

Multitasking operating system A system of cooperating computer software programs which together implement a computing method by which multiple tasks, also known as processes, share common processing resources such as a central processing unit (CPU), video device, and various input and output devices, including USB devices. When under the control of such an operating system, many computer applications (e.g., word processing programs, email programs, photo editing programs, etc.) can execute concurrently, sharing computer resources. Examples of multitasking operating systems include, but are not limited to, Windows, MacOS, Unix, and Linux.

Numerical integration. Any one of many digital techniques of determining mathematically the future course of one or more variables given their present value and rates of change and a theory enabling the calculation of these variables.

Paddle A button box used at an astronomical telescope to control motion of the telescope by tactile reference.

(PC) Personal computer Any general-purpose computer whose size, capabilities, and original sales price make it useful for individuals, and which is intended to be operated directly by an end user with no intervening computer operator. As referred to in this disclosure, the laptop variety of PC generally is assumed.

Proper motion This term usually refers to the slow motion, over years, of stars from their catalog positions. It is also applied to solar system objects that have much faster motion relative to "fixed" stars.

Random walk An accumulation of random error with generally worsening consequence.

Right ascension Measured in the same way as hour angle but from a point fixed in the sky and positive east. Used to chart star positions. Hour angle and right ascension differ by a rotation angle of the Earth called sidereal time, which differs from Greenwich sidereal time, by the site longitude. The right ascension/declination system is thus fixed to the stars rather than the earth even though it is closely related to the hour angle/declination Earth bound system.

Rotation matrix An array of nine numbers that describes the relative orientation of coordinate systems, like those of the stage 100 FIG. 1 and base 110 FIG. 1. Used to transform vectors from one system to another. This matrix only has three degrees of freedom: It can be computed from three Euler angles, or from other rotation matrices. When the coordinate systems are coincident, the Euler angles will be zero: In this case the rotation matrix is said to be a unit matrix which leaves vectors unaltered.

Sidereal (See Right Ascension). A clock (an analog device that models the rotation of the Earth) keeping sidereal time runs a slightly different and faster rate than a solar time clock. Greenwich sidereal time is the Right Ascension of stars on the Greenwich meridian. Local sidereal time is the right ascension of stars on the observer's meridian and differs from Greenwich sidereal time by the observer's longitude. The clock rate may be rescaled mathematically to enable a telescope to track the Sun at a solar rate or the Moon at a lunar rate with good accuracy and without the need for ephemeredes of these objects.

Sky. The celestial sphere. A mathematical sphere of unit radius with the observer at its center. Points on this sphere are reference directions and the distance between them measured in angles subtended at the center.

Spherical coordinates Two angles which uniquely locate a point on the surface of a sphere, typically the celestial sphere. A familiar example is longitude and latitude.

Stepper motor A brushless, synchronous electric motor that divides full shaft rotation into a large number of discrete steps. The motor's shaft is rotated by providing a series of countable electrical pulses to cause the shaft to turn one step or a known fraction thereof for each pulse. Stepper motors provide motive power and metrology in a single device because they can be geared to divide desired motion into an arbitrary large number of countable discrete steps.

U-Joint Universal joint A gimbal like device with two pivots, the two axes of which intersect at a right angle. Commonly used to transmit rotary motion from one shaft to another when the shafts are not co-linear but with shaft axes that intersect at the common pivot point.

(UTC) Universal Coordinated Time An international time standard related to various astronomical time standards. UTC is the time commonly kept by clocks the world over after applying a time zone offset which varies with longitude and a daylight saving time offset. These offsets are usually an integral number of hours from UTC.

(USB) Universal Serial Bus A standardized communication protocol between a personal computer and one or more external devices. Each USB cable connection supplies not only a two way communication channel but sufficient power to support peripheral microprocessors, obviating the need for separate external power supplies. However, this power is inadequate to drive the actuatormotors typically needed for telescopes. USB device An electronic device that conforms to the USB communications protocol and hardware standard. USB devices are connected to a personal computer with a USB cable that conforms to the USB standard. USB microprocessor is designed to facilitate communications with a partner USB device, usually a personal computer. The chip is often used in USB devices to provide some functionality not supported by the personal computer. The chip incorporates a portion or all of the USB communications protocol within hardware.

Vector An imaginary line between two points in space. Described by its length and two angles or the three projections of its length onto thee axes of a frame of reference zenith the point in the sky directly overhead.

BACKGROUND

1. Field of the Invention

Astronomical telescope platforms and mounts

See US Patent Classifications 359/429, 430; 74/490.06

2. Prior Art

The following is a tabulation of some prior art that is relevant:

| U.S. Pat. Nos. | | |
| --- | --- | --- |
| 7,388,700 | June 2008 | Odhner |
| 7,035,005 | April 2006 | Johnson |
| 6,354,168 | March 2002 | Schwaar, et al |
| 6,477,912 | November 2002 | Song, et al. |
| 6,336,375 | January 2002 | McMurtry, et al |
| 5,740,699 | April 1998 | Ballantyne |
| 5,271,592 | December 1993 | Ludwig |
| 5,004,205 | April 1991 | Brown, et al |
| 4,666,362 | May 1987 | Landsberger, |
| 4,732,525 | March 1988 | Neumann |
| U.S. patent application Ser. No. | | |
| 20100182684 | July 2010 | Burr |
| Foreign Patents | | |
| EP0515888(A1) | December 1992 | Smutny |
| EP0266026(A1) | May 1988 | Ellis |

PRIOR ART THEORY

Circa 1775, the mathematician Loenhard Euler proved that the position and attitude of a rigid body is uniquely fixed by specifying the three coordinates of a single point in the body and its rotational attitude about that point by three angles called Euler Angles. This term is commonly applied to any three angles with this property even if they do not conform to Euler's original definition. A rigid body thus has six degrees of freedom because six numbers are required to locate it uniquely and specify its orientation with respect to some coordinate frame, which explicitly or implicitly is fixed in another body, usually the Earth.

PRIOR ART PRACTICE

Historically, most astronomical telescope mounts move the telescope about two axes, which are analogs of spherical coordinates, providing two degrees of freedom. A familiar example of spherical coordinates is longitude and latitude, which locate a point on the Earth modeled as a sphere. Astronomical spherical coordinates similarly locate points in the sky thought of as a sphere centered on the observer. The sky and celestial sphere are equivalent for this purpose.

Altazimuth Mounts

A mount in which a vertical axis sweeps the horizon in the directions of a compass, called the azimuth angle and a horizontal axis sweeps from the horizon to the zenith, called the altitude angle. An example is the surveyor's theodolite. Even if motorized to track stars, these mounts generally cannot be used for long exposure astrophotography, because of view field rotation: While the telescope remains pointed at a star at the center of the field, the entire field slowly rotates about the pointing direction, which would blur a photograph taken with a telescope so mounted. This is a consequence of the mount having only two degrees of freedom when three generally are needed.

Equatorial Mounts

If the vertical axis of what would otherwise be an altazimuth mount is disposed instead to be parallel to the polar axis of rotation of the Earth, pointing not at the zenith but the celestial pole, the mechanism is called an equatorial mount. Rotation about the polar axis is called hour angle and the angle from the celestial equator towards either pole is called declination. In astronomical telescopes, a mechanism called a clock rotates the polar or hour axis at the same rate as the rotation of the Earth but in the opposite direction effectively removing the effect of the rotation of the Earth. Doing this results in the telescope being motionless with respect to astronomical objects, which are very distant. Only one degree of freedom is required to compensate for the Earth's rotation provided it is an exact analog of the Earth's rotation. The mount axes and the clock are analog devices and the star tracking accuracy is marred by analog errors in axis directions and clock rate.

Properly aligned equatorial mounts can track stars without field rotation enabling them to be used for long exposure astrophotography.

Equatorial mounts can result in large gravitational torques causing problems with tripod mounted amateur telescopes and very large professional telescopes. Alt/azimuth mounts can solve the imbalance problem because the system center of gravity can be vertically above the azimuth axis bearing center. Making both axes also pass through the center of mass of the telescope eliminates the gravitational torque problem.

Computerized Altazimuth Mounts

The advent of computer control of both of the telescope mount axes at variable rates, made it feasible to use altazimuth mounts to track the diurnal motion of stars. However, the telescope attitude as a rigid body requires three Eulerean degrees of freedom whereas the altazimuth mount provides only two. Consequently, the field of view generally rotates, which is not objectionable in visual astronomical observing, but precludes long exposure photography. Professional altazimuth mounted telescopes have a third degree of freedom: computer controlled rotation of the camera about the telescope optic axis, which makes the camera itself angularly motionless with respect to the stars. This elaboration removes field rotation but is not generally available for the amateur telescope market: Amateur astrophotographers usually resort to equatorial mounts, which require motorization of only one axis.

Field Rotation in Amateur Telescopes

Some amateur telescope makers solve the field rotation problem discussed in the previous paragraph, by mounting the altazimuth mount on a improvised wedge shaped casting mounted on the telescope tripod, with the wedge angle related to the observer's latitude, converting the altazimuth mount back to an equatorial mount. When both axes of such mounts are computerized and calibrated, the mount may track stars accurately but field rotation in astrophotography depends on the happenstance alignment of the wedge mounting plate to be perpendicular to the polar axis of the Earth.

Long Exposure Astrophotography

The advent of digital photography has opened a new realms to amateur astronomers once only the province of professionals with large astrographic telescopes. There is an expanding amateur market for telescopes designed for photography, called astrographs, which have a wider undistorted view field than telescopes used for visual observing. Specialized highly sensitive astronomical cameras are available for amateur use, but conventional single lens reflex camera bodies may be used with astrographic telescopes in which the telescope itself replaces the camera lens.

To avoid field rotation, amateurs engaged in precise long exposure astrophotography generally resort to the traditional equatorial mounts requiring alignment of the polar axis with the axis of the Earth, which requires a time consuming calibration in the field. These mounts are expensive and generally cumbersome because of the need for heavy counterweights to balance gravitational torques, making difficult travel to dark sky observing sites.

Autoguiders

Equatorial mounts in fixed installations like observatories are aligned accurately and permanently with the polar axis of the Earth. With a mobile telescope in the field, the amateur astronomer does not want to spend valuable observing time doing a high precision alignment of the mount polar axis with the polar axis of the Earth. An aftermarket device called an autoguider is available which mounts on the telescope and fixes on a guide star in or near the photographed field. The autoguider sends signals to a telescope controller, which drives both the hour axis and the declination axis of the telescope both of which axes must be motorized. The autoguider thus closes a servo loop in which guiding errors are constantly corrected. Astrophotographers often pay more for an autoguider than the cost of the camera.

Dobsonian Mounts

In the 1970s the amateur astronomer John Dobson introduced an altazimuth mount for large reflecting telescopes of amateurs which mount could be home made with materials bought at a lumber yard. This mount appealed to amateur telescope makers who could focus a limited budget on the telescope optics. The Dobsonian mount, (often called a "Dob") provides pointing ability, but generally, it is not motorized and generally has no calibrated circles or encoders to read the telescopes pointing angles. Dobsonian mounted telescopes lacking motorization must be moved by hand.

Dobsonian mounts disassemble easily and are light and easily transportable to dark sky observing sites. They have become so popular that all of the major amateur telescope makers now manufacture a line of Dobsonian mounted telescopes. The convenience of this mount has made it popular with amateur astronomers who can afford mounts that are more expensive.

A serious disadvantage of non-motorized Dobsonian mounts (most are not motorized), and indeed all non-computerized altazimuth mounts in astronomical observing is that, at high magnification, the field of view is small and the apparent diurnal motion of stars is rapid. The object will move out of the field of view in less than a minute and tracking by pushing the telescope by hand is difficult. It is a nuisance to find the object again if it moves (or is accidentally pushed) out of the field of view. If the object is lost, the observer must repeat the acquisition procedure using a finder telescope and low magnification eyepieces (with wide fields of view). The object will likewise move out of the view field of a non-motorized equatorial mount, but is much easier to find again by scanning only in hour angle.

Computerized Altazimuth Mounts for the Amateur Market

Computer controlled altazimuth mounted telescopes are sold in the amateur astronomical market usually with socalled "go-to" capability: Once calibrated the telescope can be commanded to go to any object in an extensive database of interesting objects, and then track it. Few Dobsonian mounted telescopes in use have this capability. Some non-motorized Dobs can be pushed by hand to point at an object selected from a computerized database while watching a null indicator. Long exposure astrophotography is not possible with these instruments because of field rotation. Most Dobsonian mounted telescopes in use at present lack motorization and machine-readable axis angle encoders.

Tracking Platforms

The tracking problem of Dobsonian mounts has been addressed by mounting the Dobsonian on any of a variety of low profile, motorized, analog tracking platforms sold as after market devices. An example is the Poncet mount, in which a cone, of half angle equal to the observer's latitude, has a bearing at the apex of the cone, or somewhere on the cone axis, and a track, which is a segment of the cone's surface. Ideally, the axis of the cone points exactly at the celestial pole. Motorized rollers drive the cone segment. In some variations, several tracks are used to best approximate site latitude. In others, variable radius track forms are used to provide some latitude flexibility. See U.S. Pat. No. 7,035,005, Johnson, 2006.

These prior art mechanisms constrain the range of latitude on the Earth where the mount will track correctly and depend on a happenstance alignment of the cone axis with the polar axis of the earth making accurate tracking required by long exposure astrophotography difficult or infeasible. However, for visual observing, these mounts provide far better tracking than tracking done by pushing the telescope by hand. Without additional mechanism, these analog platforms do not provide a way of browsing the view field to move the telescope to nearby objects of interest.

Hexapods

A hexapod mount has six linear actuators between a fixed base and a movable stage. Invented by Gough in 1954 for tooling operations, it is often called a Stewart platform. A Wikipedia article "Stewart platform" shows an animation of hexapod platform motion.

Hexapods have been used as a mount for surgical microscopes (cf U.S. Pat. No. 5,271,592 Ludwig 1993). Hexapods are used for telescopes (Google: radio telescope hexapod) in which it provides the ability to control both the attitude and position of the instrument where position control is needed as in microscopes, for interferometers using a plurality of telescopes, or for the alignment of secondary mirrors in telescopes.

Hexapods can be designed to slew a telescope over large angular ranges although usually they have limited ranges. When used as telescope mounts hexapods can provide both tracking and aiming within their design range of motion without field rotation. Hexapods are commercially available with tracking accuracies of the order of an arcsecond. Within its range of motion, the hexapod mechanism imposes no limitation comparable to singularities at the zenith, or the pole, or field rotation in photography that are inherent in two rotary axis alt/azimuth mounts, because it lacks no needed degree of freedom.

Quadrapods. U.S. Pat. No. 5,740,699, Ballantyne 1998, is a tool holding device. This mechanism is limited for the purposes of telescope tracking, because it constrains stage rotation, and hence could not be adapted to astrophotography without field rotation. It also provides a degree of freedom that is meaningless in most astronomical applications. A few similar mechanisms exist in prior art US patents listed in the references we have provided.

Avoidance of the Use of Personal Computers and the USB for Low-Level Control in Alt/Azimuth Mounts.

Computerized telescope control can be divided sharply into two domains of functionality, which we define here as high level and low level control.

High-level control points the telescope at an interesting object by issuing slewing commands to the low-level controller. A typical operation would be: The operator, finding an interesting object on a star map displayed on the computer screen, clicks on it and the telescope slews to that object. The computer calculates the apparent position of the object at the current instant given the identity of the object listed in a catalog in the computer database, and other data such as the observing site longitude and latitude. This is a very complicated calculation, which can be performed by open source software made available by the U.S. Naval Observatory and the International Astronomical Union. The apparent angular position of the object is sent over a serial bus, such as the USB, to the low-level controller.

The low-level controller, which runs the motors driving the axes, reads the angular positions of the axes from data provided by shaft angle encoders on the telescope axes, and servos the motors in a way that keeps the telescope tracking the diurnal motion of the object. To do this the low-level controller must perform the necessary spherical geometric calculations to transform the instantaneous hour angle and declination of the object into its altitude and azimuth, to keep the telescope pointed at the object.

Once the low-level controller receives the object position and slews the telescope to it, the low-level controller takes over the tracking functions to keep the telescope pointed at the object. It may accept small corrections to the pointing direction in the sky from a paddle or autoguider.

In this arrangement of the prior art, all of the spherical trigonometry could be done by the high level computer, if any, were it not that latency, which can be tolerated at the high level if slewing to an interesting object, cannot be tolerated at the low level of motor control required for diurnal tracking.

Avoidance of Latency

The route the amateur altazimuth telescope motion-control market has taken solves the problem latency by avoiding it; by building low-level control mechanisms that are free of latency by avoiding multitasking operating systems of this level and avoiding the universal serial bus (USB) at the low level of motor control. However, doing so requires a sophisticated microprocessor capable of doing accurate and fast linear algebra and having some transcendental mathematical functions like sine, cosine, arctangent and square root because the full burden of diurnal tracking falls on this machine.

BRIEF DESCRIPTION OF THE DRAWINGS

FIG. 5. Block diagram of system components.

FIG. 6. USB Microprocessor power up sequence. We use the abbreviation USBmP to refer to this machine.

FIG. 7. USBmP: stepper motor control logic initialization

FIG. 8. USBmP: process USB I/O requests to/from host controller computer overview.

FIG. 9. USBmP: process messages from host controller computer.

FIG. 10. USBmP: process stepper-related tasks

FIG. 11. USBmP: set stepper motor parameters.

FIG. 12. USBmP: process unsolicited message to host controller computer.

FIG. 13. USBmP: start slewing operations overview

FIG. 14. USBmP: Initiate fast slewing operations for motors S1, S2, and S3

FIG. 15. USBmP: Interrupt handling for timers T0, T1, T2, and T3

FIG. 16. Computational scheme to minimize the effects of latency.

FIG. 18 Inadvertent micrometer screw rotation

SUMMARY

Objectives

Figure 1:
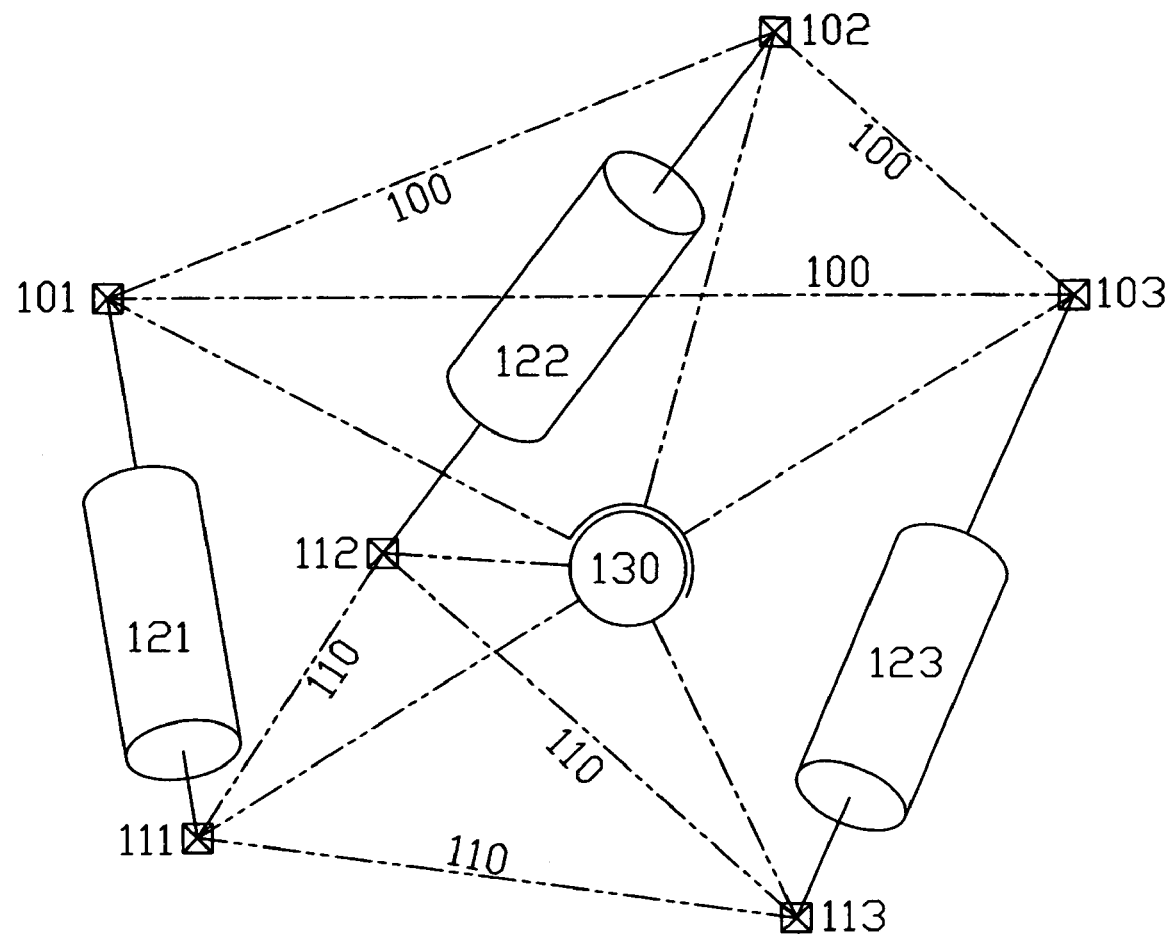
FIG. 1. Platform showing the relationship of the base, stage, central pivot and three actuators FIG. 2. Preferred embodiment the mechanism of FIG. 1 for use as a Dobsonian tracking platform FIG. 3. Different perspective of FIG. 2 with addition of unloader springs FIG. 4. An embodiment optimized for long exposure astrophotography.

Two of the objectives of the embodiments of the mechanism of FIG. 1 are to provide a tracking platform for:
1. Dobsonian mounted telescopes to allow steering and astrophotography;
2. Astrophotography with altazimuth fork, or similarly mounted telescopes.

These objectives do not precluding the use of the tracking platform for other purposes involving celestial tracking such as solar mirrors or such tracking for antennas, transmitting or receiving, aimed at artificial or natural celestial bodies.

The control of this mechanism of FIG. 1 requires no mathematical approximation. When calibrated, it can track accurately at any latitude and track objects moving through the zenith and track them without field rotation, whereby long exposure astrophotography becomes possible with the instruments of items 1. and 2. above.

The FIG. 1 mechanism allows movement to nearby objects without additional mechanism. An example would be panning with high magnification across the face of the Moon.

Analog tracking platforms of the prior art, for use with Dobsonian mounted telescopes, cannot track at every latitude nor do they provide a means of panning without additional mechanism.

Motorized alt/azimuth mounts of the prior art cannot track objects through the zenith, nor can they track without field rotation which prohibits long exposure astrophotography.

Comparison with Prior Art.

Prior art Dobsonian analog tracking platforms generally approximate or restrict the observing site latitude and aim at the Celestial Pole with happenstance accuracy.

These platforms provide adequate tracking for visual observing in the range of heavily populated latitudes, but are not suitable for long exposure astrophotography. They do not provide an integral means of moving the telescope to other objects of interest in the view field. The embodiments of FIG. 1 have no such restrictions of the prior art tracking platforms.

In contrast to the hexapod, the mechanism of FIG. 1 has only three actuators. Three pods of the hexapod are replaced by a fixed central ball pivot or equivalent passive device. Lateral or vertical linear motion of a single instrument, which is possible with hexapods, is not required for the observation of astronomical objects, because the distance of astronomical objects is so great as to make such motion of a single instrument meaningless. The ability to move the instrument laterally is only important when several instruments are combined in an interferometer when the distance between instruments becomes important. Such usage, common in radio astronomy, is not an intended objective of our design.

In contrast to hexapod mounts where the full weight of the telescope is carried by the actuators, the mount of FIG. 1 requires half the number of actuators, which are relieved by the central ball joint from carrying the telescope weight. In another embodiment shown in FIG. 3, over-center gravitational torques, when the platform is tilted, are exactly cancelled by springs, which also carry the full telescope weight.

These advantages over the hexapod arrangement allow the use of fewer, simpler, and hence less expensive actuators.

The PC as a Control Computer

Because of the complex motions required by altazimuth tracking, the use of highly developed generally available personal laptop computers would appear obvious especially because these machines provide open-ended access to supporting software like planetarium and star maps, apart from their easy-to-use graphical user interfaces. The universal serial bus (USB) is now standard on all personal computers and makes available a rich choice of auxiliary devices. However both multitasking operating systems, now standard with PCs and the USB introduce latency. It is inimical to the exact timing of events required by motor control of precision tracking although it does not present a problem when the telescope is to be slewed from one object to another in a different part of the sky.

It is common in the prior art to include in a hand held button box, commonly called a paddle, a powerful micro processor capable of the astronomical calculations as well as motor control, obviating latency. This requires the user to buy a machine, keyboard and display duplicating one they may already own and which they may already be using as a high level control device, for example to have the telescope track an ephemeris object like a comet or asteroid.

It has been our experience using such button boxes in the prior art that the restricted interface they provide makes their use cryptic and arcane. We have been called to the assistance of others who have found them difficult to learn to use. This experience was a factor that motivated us to use personal computers for telescope control using the FIG. 1 mechanism for aiming as well as motor control for tracking, despite the latency problem, which we had to solve.

What was not obvious to us was the solution to the problem of latency of the operating system and the USB as these latencys affect telescope control at the motor level. At least for the computerized control of the mechanism of FIG. 1 and its embodiments, we have solved this problem by positing all of the complex mathematics in the high-level processor in a way that requires the USB terminal processor to have no greater math capability than single byte addition subtraction and shifting instructions.

Restricted Range of Motion

In the interest of keeping the embodiments of the mechanism of FIG. 1 compact, the range of motion is restricted for reasons discussed under "Detailed Description". This restriction is of no disadvantage in its application to Dobsonian tracking platforms. The Dobsonian mount provides a means of pointing the telescope anywhere. The embodiment provides tracking and fine steering once the telescope is pointed. Analog tracking platforms of the prior art are similarly restricted in motion in the interests of keeping the profile of the platform low, so as not to raise the height of eyepiece of the telescope above the ground to an uncomfortable height. The range of motion is also limited with any such platform to prevent excessive tilt causing a telescope not bolted to the platform to tip or slide off the platform stage.

With either:
the embodiments of this disclosure or
prior art analog tracking platforms,
the platform must be slewed back to the start of a new tracking arc, requiring re-pointing of the telescope.

Astrophotography

Figure 4:
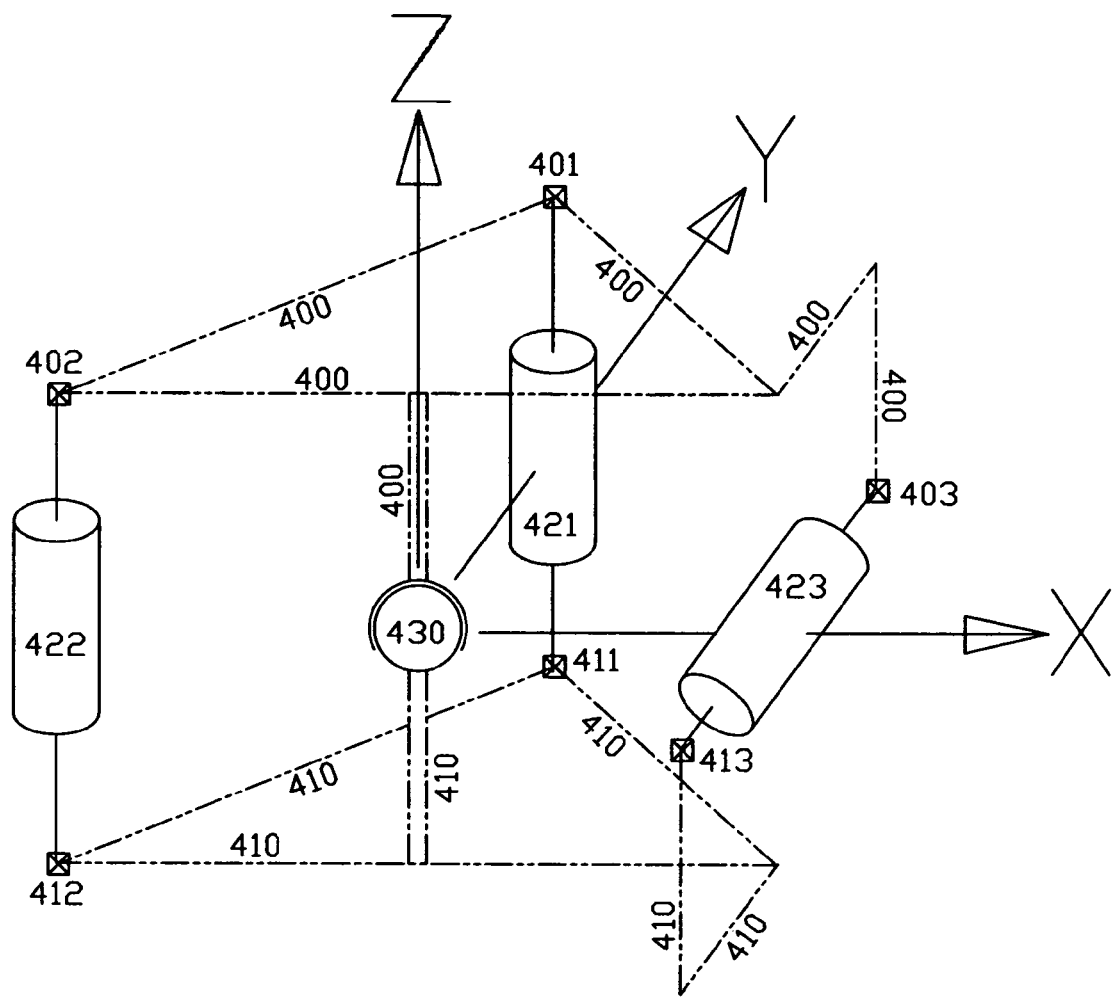

The geometry of FIG. 4 embodiment of FIG. 1 can allow photographic exposures of 3 hours (an hour angle slew of 45 degrees), without encountering singularities, at the expense of lengthening the actuators and raising the platform height by 50% over that required for a tracking arc of 1.5 hours.

Accuracy

Those with an ordinary understanding of numerical analysis and related statistics will understand the following: Monte Carlo studies of the mechanism of FIG. 1 which introduce random errors of 25 micron standard deviation into the actuator point positions an angular error of 10 arcseconds standard deviation into the angular calibrations produce average tracking errors of about 10 arcseconds over a typical tracking arc. If calibrations are done using a plurality of stars to refine the database accuracy of the location of the points upon which the actuators act to an accuracy 5 microns standard deviation, tracking error can be reduced to a few arcseconds, provided no other comparable sources of error be controlled.

These studies did not include the effects of flexure of the telescope and platform. Because the platform of the mechanism of FIG. 1 and its embodiments usually will be used in conjunction with a computationally powerful personal computer, there is no reason in principle that flexure correction not be included, as is done in professional telescopes, obviating the need for an expensive autoguider.

DETAILED DESCRIPTION OF THE INVENTION

Theory

The terms platform, base, stage, and anchor-points, when defined as referring to component parts are shown in FIG. 1 and are printed in bold type.

FIG. 1 shows the general scheme of the mechanism, which is divided into two rigid bodies, the base 110, which generally would rest on the ground, and the stage 100, which carries the telescope. The stage and base share a single point in common which may be implemented with a ball joint tagged 130 in FIG. 1. There is no restriction on the location of placement of this single point, which may be above the stage, below the base or in between the stage and base. The surface of the ball may be a spherical segment between the base and stage, but the point at the center of the sphere defining the spherical segment may be above the stage. Nor need the mechanism defining this point be a ball joint. A universal joint at 130, and bearing to allow stage rotation could be used instead. However, a ball joint usually would be a more simple way of assuring that a single point 130 fixed relative to the stage remains in correspondence with a single point fixed relative to the base.

Actuator 121 of FIG. 1 can vary the distance between anchor-point pairs 111 in the base and 101 in the stage. Actuators 122 and 123 likewise can vary the distance between anchor-point pairs 112,102 and 113,103 respectively. To prevent torque from being transmitted through anchor-points, ball or universal joints (U joints) may be used. U-joints are typically used in hexapods. The stage anchor-points of FIG. 1 are rigidly interconnected, as depicted by phantom lines labeled 100 in the stage and likewise the base anchor-points in the base 110, because the base and stage are separate rigid bodies. Phantom lines also depict the rigid connection between the moving parts of the ball joint 130 and the base 110 and the stage 100. The phantom lines imply no particular material form except that which is substantially rigid without interfering with other bodies of the mechanism within the intended range of motion.

Provided certain singular configurations are avoided, it is demonstrable that the spatial attitude of a rigid body relative to another, if they share a pivot point in common, is determined by the location and by the lengths of three vectors between three pairs of points. One point of each pair is in one body and the other point of the pair is in the other body. If these lengths are unchanged, the two bodies generally become a single rigid body. Three actuators, each act between a point in the base and a point in the stage, enable these distances to be varied. These points, which we call anchor-points, may be implemented with backlash free gimbals or universal joints (U joint) allowing free angular motion about two U-joint yolk axes, which intersect accurately at the anchor-point. Ball joints may also be used for these anchor-points. However, they introduce complications, which may not be objectionable in some applications.

Coordinate Systems

It will be evident to those with ordinary skills in mechanical engineering and three dimensional vector geometry of rigid bodies that:

a coordinate system must be established fixed in the base;
a coordinate system must be established fixed in the stage;
the locations of the anchor-points in these systems will be specified in blueprints.

What is not immediately obvious is that the locations of these coordinate systems in the mechanism of FIG. 1 and its embodiments are arbitrary, because they embody no analog geometry. In contrast, the choice of coordinate systems in analog mounts having rotating shafts strongly urge the choice of shaft axes as coordinate axes. A corollary for the FIG. 1 based mount is that one may change the definition of the anchor-point locations for calibration purposes: No matter how the embodiments of FIG. 1 are constructed, the anchor-point locations are always correct (barring grotesque deviations from the blueprints). The blueprint needs calibration; not the mechanism. This property of the FIG. 1 embodiments is also true of hexapods. It is unknown to us whether advantage is taken of this property in hexapod calibration.

Unambiguity of the Stage Orientation Relative to the Base

The following will be evident to those with ordinary skills in mechanical engineering and three-dimensional vector geometry of rigid bodies. If the relative rotational attitude of two bodies is fixed by an array of nine numbers called a rotation matrix, and the two bodies share a single point in common, then vectors between any number of the point pairs are uniquely determined, where one point of each pair is in one body and one point of the pair is in the other body. Hence, the lengths of such vectors are uniquely determined. This is true because the rotation matrix is a unique descriptor of the relative attitude of the two bodies. When the rotation matrix is fixed, the two bodies behave as a single rigid body in which the distance between any two points is invariant, which invariance may be taken as a definition of 'rigid'.

Falsehood of the Converse

The following assertion, which is a special case of the converse of the preceding paragraph, is not obviously true: If two rigid bodies share a single point in common, they will behave as a single rigid body if the following condition generally is true: Fix the distance between three specified point pairs, one point of each pair being in one body and the other point of each pair is in the other body. These three fixed distances, in certain cases, fix the rotation matrix describing the relative position of the two bodies and hence the relative position of the base (FIG. 1. 110) and stage (FIG. 1. 100).

The proof that this is true in certain configurations of the FIG. 1 embodiments is complicated by the fact that, generally, it is not true with the mechanism of FIG. 1. In the following paragraphs, we discuss how this breakdown of uniqueness can occur.

The terminology used in the following two paragraphs will be understandable to those with ordinary skills in three-dimensional vector geometry.

Multiple Domains

Several domains exist in which a set of given lengths of three vectors between the base and stage of the FIG. 1 mechanism is realized mathematically by different stage positions relative to the base.

Indeterminacy

A transition of the stage position of the FIG. 1 mechanism, from one such domain to another, passes through a region of mathematical indeterminacy in which the length of some actuator is independent of the stage position and hence cannot control the stage position.

The mechanism of FIG. 1 eliminates three of the actuators of the hexapod replacing them with a single zero length passive ball joint (or equivalent). That this simplification is fraught with indeterminacy and the lack of uniqueness described in the last two paragraphs, may explain why it has not been used as a telescope mount in the half century that the hexapod has been in use. The existence of solutions for which the three actuator lengths of the mechanism of FIG. 1 uniquely determines the stage position has evidently been overlooked in the field of telescope mounts.

There are in the prior art several mechanisms that use three or four actuators to aim tiltable mirrors or tool holding devices: Those most closely resembling FIG. 1 mechanics that we have been able to find in the prior art are:

U.S. Pat. No. 7,388,700, June 2008, Odhner, has a central ball joint and four parallel pistons to tilt a stage that is constrained against rotation;

U.S. Pat. No. 6,336,375, January 2002, McMurtry, et al uses three struts and no central ball and has a constraint against rotation;

U.S. Pat. No. 5,740,699, April 1998 Ballantyne has 3 strut like the FIG. 1, mechanism and a central extensible pylon that constrains the stage against rotation;

The constraints against stage rotation in the above cases preclude their adaptation to telescope mounts for the intended applications of the embodiments of the FIG. 1. mechanism.

The Existence of Unique Solutions Free of Singularity

The practicality of an embodiment of the FIG. 1 mechanism, as a tracking platform, lies in the possibility of constructing it so that it always remains in one domain where
  the stage position is uniquely determined by the length of three actuators;
  the regions where indeterminacy can arise cannot be reached within the permitted range of the actuators.

For the stage positions uniquely determined by the length of the three actuators in such an embodiment, the actuator lengths restrict the range of motion, so there is a trade off between compactness of the mechanism, and the angular range of motion before the danger of indeterminacy arises.

We found two embodiments of FIG. 1, which meet the requirement of domains of unique solutions stage position of actuator lengths over useful ranges of motion, which are free of indeterminacy or inaccuracy. One is depicted in FIGS. 2, 3, and the other in FIG. 4.

Figure 2:
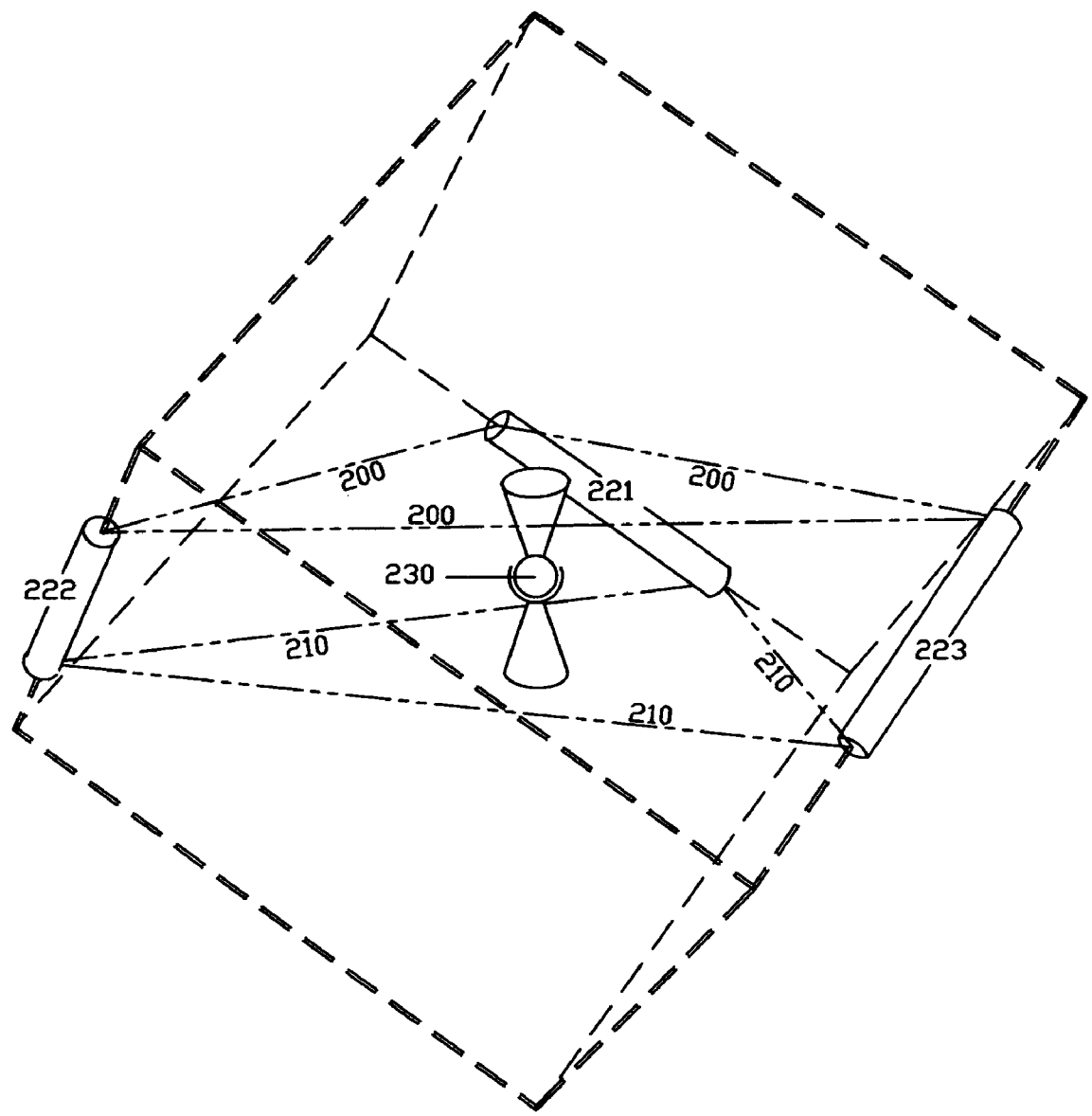
Figure 3:
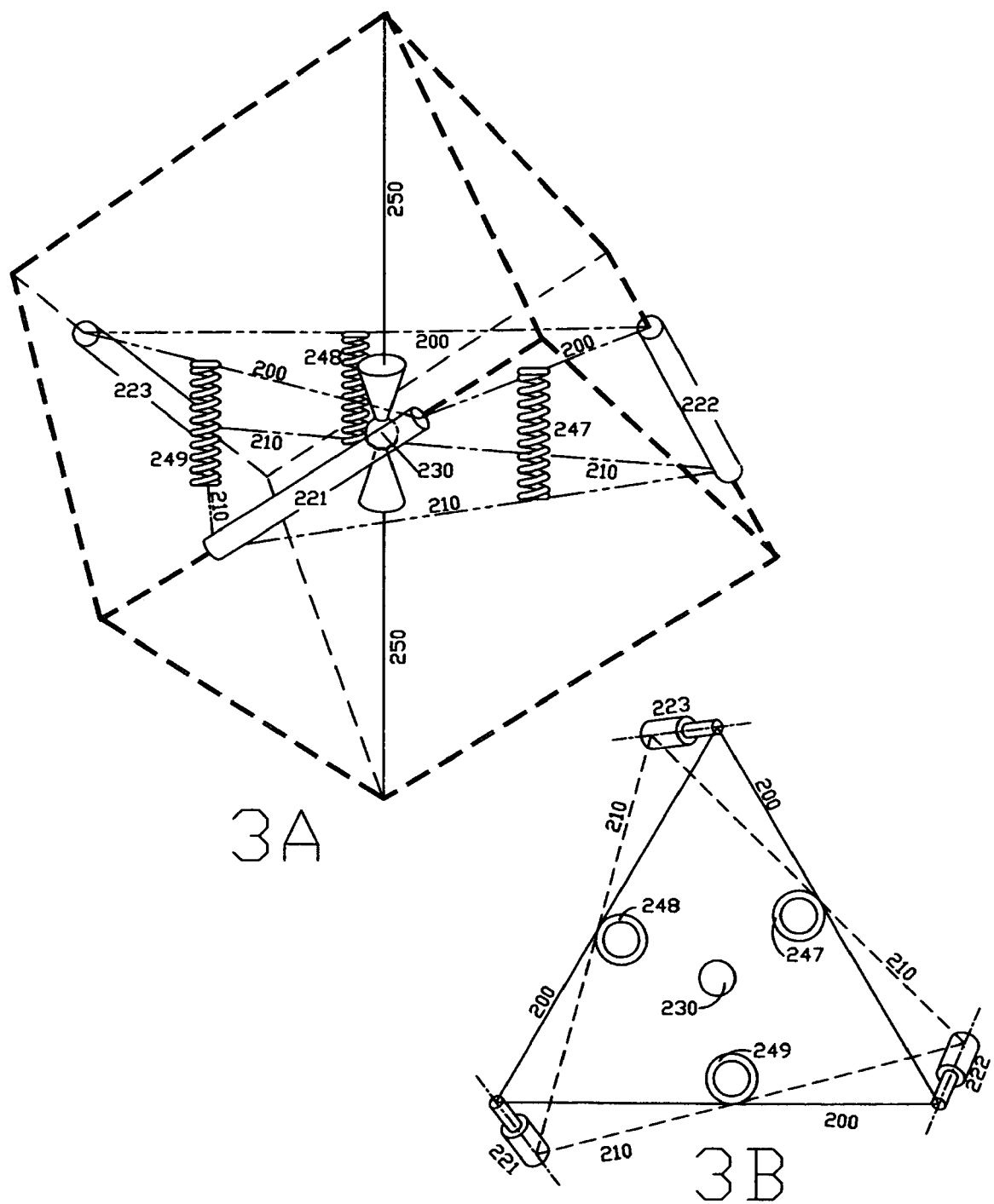

It will be evident to those with ordinary skills in mechanical engineering, that the symmetries with respect to mirror image reflections separately with the mirror normal to each actuator axis in FIG. 2 or normal to each of the shown coordinate axes in FIG. 4, will give rise to equivalent mechanisms. Less obvious, but a finding we have tested mathematically, is that considerable deviations from the exact morphology of FIG. 2 and FIG. 4 yield workable mechanisms.

When the tracking mount exhausts its range of motion in such an embodiment, it must be slewed to the start of a new tracking arc, a process which can take only a minute even when stepper motors are used in the actuators. Slewing to the start of a new tracking arc is also required of prior art analog tracking platforms.

Two Actuators

It may appear that the FIG. 1 mechanism can work with only two actuators, provided the stage be constrained against rotation, because a direction of pointing has only two degrees of freedom. However, such a mechanism has two severe restrictions for the intended application of a tracking platform for telescopes:

1. In order to follow the diurnal motion star with a two-actuator platform the host computer must know the coordinates of the star. The observer browsing the sky may not know the coordinates of the object the telescope is currently pointed at, much less want to be burdened by finding out and keying in the coordinates to the control computer in order to get the platform to track correctly. Dobsonian mounts as a rule do not have shaft angle encoders on the telescope axes that could be readable by the host computer, although some do.

2. A second disadvantage of the two-actuator platform is that it cannot in general track diurnal motion without field rotation even if it can otherwise track a star. This precludes the use of such a platform for long exposure astrophotography in which rotation about the optic axis of the telescope will blur all images except the star at the field center.

The control of the three-actuator mount of FIG. 1 does not require, but does not preclude, communication between the telescope and the host computer. For example if the telescope had shaft angle encoders on conventional axes, such as on alt/azimuth mounts, the computer could be programmed to read them and could track with only two actuators. This communication capability, which Dobsonian mounts generally do not provide, still does not solve the problem of field rotation: Long exposure photography would still not be possible with such an arrangement.

Polar Rotation with a Three-Actuator Platform

The three-actuator platform of the embodiments of FIG. 1 can be programmed to rotate the stage about the Earth's polar axis, as is done in analog equatorial mounts, at a rate canceling diurnal motion, and without introducing field rotation, and with the telescope mounted on the platform pointed in any direction. Unlike the equatorial mount, the platform depicted in FIG. 1 has no analog mechanism requiring alignment with the polar axis. However, like all telescope mounts, it does require calibration.

Mathematical Indeterminacy

The above considerations to avoid mechanical indeterminacy do not necessarily avoid mathematical indeterminacy. Astronomical considerations will require the stage to be moved to some position. We have to be sure this request can be realized in the intended domain of a unique relationship between stage position and actuator lengths.

Mapping the Domain of Determinacy

When we design the mechanism, we can map the extent of the design domain by examining the ratio of the change in actuator length with respect to stage position specified as Euler angles; we can determine the range of motion to ensure we are not close to a singularity. In most practical designs, inherent limitations of the range of action of the actuators will prevent the stage from ever reaching an indeterminate position. Even if the mechanism cannot reach such a state, we must be sure that the astronomical software will never ask it to do so.

Euler Angles and Actuator Lengths

It follows that actuators set up in accordance with the principles of avoiding indeterminacy, when the rotation matrix is unit, i.e. when the stage and base coordinate systems are coincident, small changes in actuator length are related to angular rotations about the orthogonal axes that approximately are Euler angles. It may seem that the actuator lengths are thus equivalent to Euler angles or simple functions of them. However, there is a marked distinction between actuator lengths and Euler angles as means of determining the stage position (FIG. 1, 100) uniquely. It is a well-known property of Euler angles that they are not commutative. This means that the stage position, and hence the rotation matrix defining it, depends on the order in which the Euler angles (thought of as rotations about orthogonal axes fixed in moving body) are applied to the axes. If this order is commuted, the resulting rotation matrix and hence the spatial position of the moving body will be different, even though the same angular rotations are applied to the same axes in each case.

By contrast, in the mechanism of FIG. 1, the three-actuator vector lengths always determine the rotation matrix uniquely regardless of the order of application, subject to the precautions to avoid singularities discussed above. Equatorially or altazimuth mounted telescopes are not rigid bodies in the above sense but various rigid bodies interconnected by rotational freedom that makes each rotation an analog of a spherical coordinate. The commutation of Euler angles problem does not arise.

DETAILED DESCRIPTION OF THE EMBODIMENTS

The mechanism shown in FIG. 1 relates to telescope mounts or platforms which track the diurnal motion of stars, or other objects moving relative to the stars such as comets, planets and natural satellites, asteroids, artificial satellites, and interplanetary spacecraft. FIG. 1 is discussed above in connection with the general theory. Particular embodiments are discussed below. The phantom lines in FIG. 1 only signify that points so connected are rigidly connected. The way of doing so in practice will be obvious to the designing engineer. It will depend on the intended application and method of construction, be it done with castings, tubing weldments or assemblies of machined plate and rod. Because the claims we make do not depend on particular choices of such machinery, it is not shown in FIGS. 1, 2 and 3 except for a symbolic pylon in FIGS. 2 and 3 supporting central pivot 230.

Dobsonian Tracking Platform

FIG. 2 shows an embodiment optimized for use with Dobsonian mounted telescopes. Other embodiments of FIG. 1 that are useful with Dobsonian mounts may exist.

The phantom lines 200 of the stage and 210 of the base of FIGS. 2 and 3 only depict rigid connection between points and not a particular mechanical configuration of material that fulfills the purpose of rigidity. The term "zero extension" in the following refers to the nominal actuator lengths when they are not extended or retracted.

The actuators of FIG. 2, at zero extension, lie on three substantially mutually orthogonal edges of a cube with no two actuators sharing the same cube face: Dashed lines show the cube, emboldened where necessary to clarify perspective. The lines of action of actuators do not intersect.

The base 201 anchor-points of the actuators lie on the vertices of an equatorial triangle 210.

The stage 200 anchor-points of the actuators lie on the vertices of an equilateral triangle 200.

The actuators 221, 222, 223 are depicted by cylinders in FIG. 2 of variable length between anchor-points of the base and stage.

The Dobsonian alt/azimuth mount (not shown), or other mount, rests on the stage.

To avoid clutter, the anchor-points are not labeled as they were in FIG. 1. When the stage and base coordinate systems are coincident, the actuators are at zero extension; their axes each subtend an angle of 35.26 degrees with a horizontal plane when the base and stage are level. This small angle keeps the platform low, which is desirable with Dobsonian mounted telescopes, which normally are mounted on the ground.

FIG. 3A is a different perspective view of FIG. 2. FIG. 3B shows a plan view of the mechanism when the stage and base are horizontal. Springs 247, 248 and 249, which are not essential to the geometric function, are discussed elsewhere and are irrelevant for the present discussion.

There is no compelling reason for the actuators at zero extension to be exactly orthogonal: Sacrificing some orthogonality by making the above angle lower, for example 30 degrees, lowers the platform height without significantly impairing tracking accuracy.

The mirror images of FIG. 2 or 3 are equivalent mechanisms, provided these transformations are reflected in the control computer code.

The common pivot point 230 of FIGS. 2 and 3 may be anywhere, but placing it midway between the centroids of the equilateral triangles 200 and 210 will generally give the greatest range of motion. The pivot point is depicted in FIGS. 2 and 3 as ball joint 230 connected to the base and stage by pylons.

The design shown in FIGS. 2 and 3 can easily provide tracking for more than an hour. Longer tracking times will raise the platform height by requiring longer actuators with greater ranges of motion.

An Embodiment Optimized for Astrophotography. FIG. 4

For clarity FIG. 4 is shown with the stage and base coordinate systems coincident labeled as X,Y,Z, this labeling of axes being arbitrary. At zero extension, actuators 421 and 422 are parallel to the Z-axis in this configuration with 421 on the +Y axis and 422 on the −X axis. This is done for convenience so that increasing the actuator lengths produce positive rotations, following the usual conventions for right-handed coordinate systems, about the X and Y axes respectively. Actuator 423 is somewhere in the XY plane. It is shown in FIG. 4 as parallel to the Y-axis and on the +X-axis. Increasing length of this actuator 423 produces positive rotation about he Z-axis, likewise a convenience but not a necessity. The actuators will move from the configuration shown in FIG. 4 when they change their length and tilt and rotate the stage; the base and stage coordinate systems will no longer be coincident as depicted in FIG. 4. The phantom lines 400 of the stage and 410 of the base depict rigid connection between anchor-points and not a particular mechanical configuration of material that fulfills the purpose of rigidity.

With long time exposure photography, the FIG. 4 placement of actuators is preferred over the configuration shown is FIG. 2. The FIG. 4 arrangement can be designed to track up to about 3 hours, because it maximizes the angle of tilt of the stage without interference between mechanical components. Extending the tracking range from 1.5 hours to 3 hours significantly raises the platform height, because of the need for longer actuators. FIG. 4 arrangement would be most suitable for use with short tube altazimuth fork mounted telescopes such as Maksutov and Schmidt-Cassegrain optics to provide tracking free of field rotation in astrophotography.

The FIG. 4 arrangement also can be used as a platform for small Dobsonian mounted telescopes. For given actuator lengths, the FIGS. 2 and 3 arrangement is almost half the height of the of the FIG. 4 arrangement of actuators. Unnecessarily raising the height of large Newtonian telescopes that are Dobsonian mounted can put the telescope eyepiece at an uncomfortable height.

Actuator forces: If the actuators use micrometer screws and resemble screw jacks, it may appear that their high mechanical advantage will make them capable of exerting very large forces. This conclusion is deceptive. Regardless of the mechanical advantage of the actuators of a worm gear driven screw design, the sliding friction with a coefficient of friction that is typically 1/10 will mean that a 100 kgf force on the actuator will require forces of the order of 1 kgf at the periphery of the worm, which can stall stepper motors with 4 or 5 cm frames running on a 12 volt supply at fast slewing speeds. We have found that a safe load limit with such motors is about 10 kgf.

Comparison with Hexapods

In hexapod mounted telescopes, the entire weight of the telescope is borne by the actuators. Unless the stage moves in a way to keep the center of mass of the telescope over the centroid of the actuator footprint, the hexapod actuators are also required to carry forces to offset this gravitationally induced torque.

In the mechanism of FIG. 1 and FIG. 2, when the stage is tilted in any way such that the telescope center of mass is not vertically above central ball center 130 of FIG. 1, the actuators must offset the resulting gravitational torque. However, unlike hexapod mounts, the dead weight of the telescope is carried by central ball joint 130 of FIG. 1. Unlike hexapods, because lateral motion of the FIG. 1 stage is frozen, a means is possible to shunt through frictionless apparatus, not only the over-center gravitational torque when the stage is tilted, but also the entire weight of the telescope, in a way that prevents these forces from being borne by the actuators or even the central pivot.

The Apparatus to Shunt Forces Around the Actuators

Springs, nominally vertical, of which helical springs are an obvious but not exclusive choice, mounted on the vertices of a regular polygon, centered on central ball joint center 130 of FIG. 1 and its embodiments have the following property. If all the springs have the same spring constant and actuate between the base and stage, the spring torques about the central ball joint will add vectorially to produce a restoring torque which is proportional the sine of any stage tilt angle. However, the over-center torque of the telescopes center of mass, which moves laterally when the stage is tilted, also varies as the sine of the stage tilt angle. It is follows that spring constants (relating the force to unit length compression, or tension) can be chosen that will make these spring torques substantially equal and opposite to the gravitational over-center torque. Springs of a given spring constant have another defining parameter: spring length. Compression or stretching of spring, over a wide range, does not change its spring constant. The compression of each spring can be designed to produce an uplifting force exactly or closely equal to telescope weight for all the springs combined. It is furthermore demonstrable that there exists some combination, which also depends on the size of the aforementioned polygon, for which both conditions are met simultaneously: The springs both support the telescope and neutralize over-center torque.

FIG. 3 depicts springs 247, 248 and 249 between the base 210 and the stage 200. These springs are arranged on the vertices of a regular polygon of 3 or more vertices centered on 230. They need not be placed preferentially with respect to the actuator anchor-points. The distance from the central pivot 230 may be varied to adjust the over-center torque restoring torque.

Preventing Destabilizing Torque

The arrangement of springs described in the preceding paragraph to shunt gravitationally induced forces around the actuators will produce a destabilizing torque with respect to rotation of the stage, which may, or may not, be significant. However, two sets of springs can be used, one set under compression on the vertices of a polygon centered on the central pivot and another set of springs under tension on the vertices of another polygon. With this arrangement, the destabilizing torque can be neutralized, as well as the over center torque, while the net upward force of all the springs combined substantially supports the weight of the telescope. In this way, all gravitationally induced forces and torques in the mechanism of FIG. 1 and its embodiments can be shunted through frictionless devices, instead of transmitting these forces through the actuators and central ball joint. When light telescopes are used, the force shunting mechanism is unnecessary. It would be more necessary for large mirror telescopes.

The actuators and central ball joint are precision mechanisms upon which the accuracy of the embodiments of mechanism of FIG. 1 depends. Maintaining this accuracy by not requiring the actuators to transmit large forces is a considerable economy bought at the price of springs, which are simple, frictionless, and inexpensive. The mechanism of springs described above will not work as described with hexapods.

Detailed Description of the Digital Control Functions

Nothing in the forgoing description of the mechanism implies a particular method of controlling the actuators to achieve desired tracking an slewing motions.

The following description pertains to a particular choice of the machinery of control. It describes machines that are essentially digital.

The mathematics of slewing and diurnal tracking is posited in a general-purpose computer, which may be controlled by a multitasking operating system. We will refer to this machine a being the host computer. Low level control of the electric motors which power the actuators is posited in a USB microprocessor or similar machine we will refer to as USBmP. The actuators are depicted in FIG. 1 as 121, 122, 123 or in FIG. 2 as 221, 222, 223 or in FIG. 4 as 421, 422, 423. However, a machine designed for USB service allows communication using a USB cable connection and the convenience of the USB protocol. This processor is not required to have any mathematically ability beyond a single byte (8 bits) add and subtract instruction, 1 bit rotate left or right instruction and instructions to set or interrogate a single bit of a byte. This machine is not required to have a multiply or divide instruction let alone transcendental math functions. None of the mathematics of control which involve coordinate system transformations can be posited reasonably in a machine of the simplicity just described. Nor can detailed motor control functions can be posited in a host computer running in a multitasking mode because latency of the operating system and the USB channel would introduce unacceptable timing uncertainty into the motor control functions.

We define the term milestone to be an event in time when the host computer sends to the USBmP information (a list of parameters) to allow it to control the actuator stepper motors with sufficient tracking accuracy to reach the next milestone without further intervention of the host computer. The host computer predetermines the interval between milestones, which interval is typically in the range from 10 to 100 seconds. A timer internal to the USBmP times milestone events. At the end of each milestone the USBmP sends the current motor status to the host computer which uses this information to correct any accrued error when calculation the parameters of the next milestone interval.

Detailed Description of the of the Digital Machinery

The remaining material of this section, which will be understandable to those with ordinary skills in computer programming, is given for the sake of completeness in the specification. It is not a prerequisite for understating the principles of operation of the embodiments of FIG. 1, or the claims, except where such reference is given elsewhere.

FIG. 5 illustrates a block diagram of the system components comprising both the host computer, Box (503), the USB microprocessor which we have referred to as USBmP Box (505).

An Example of a Peripheral Device is Shown in Box (501).

Box (501) of FIG. 5 is a readily available USB game controller. We chose a Dual Action device manufactured by Logitech, but any similar device would be suitable. The requirements for this game controller are that it exposes a sufficiency of push buttons and one joystick to the operator. We use this device as a button box to perform telescope control functions using tactile reference while observing so that attention is not diverted from observing. This is the equivalent of the prior art paddle. A USB channel such as Box (501) of FIG. 5 may similarly connect any number of other peripheral devices such as webcams. Box (501) is connected to box (503) via data flow arrow (502), a standard USB connection. Box (503) is a general purpose personal computer (referred to throughout this document as the "host computer") which is under the control of a multitasking operating system. We chose Windows for the operating system, but other operating systems, such as MacOS, or Linux would be suitable. Of the various types of personal computers available, we chose a readily-available laptop from Gateway Corp. Box (503) is connected to box (505) via a standard USB connection, indicated by data flow arrow (504). Box (505) is a USB microprocessor. This device receives digitally encoded commands from the host computer, block (503), via data flow arrow (504), processes them, and returns digitally encoded responses to box (503). For box (505), we chose the readily available PIC18F4550 device manufactured by Microchip Technology, Inc., but any similar device would be suitable. The desirable requirements for the USB microprocessor are that it has (a) Four Programmable timers
(b) Twelve available pins that can be used for digital input-output operations.
(c) 32 kilobytes of flash program memory space.
(d) 2 kilo-bytes of data memory space.
(e) 1 high-priority interrupt mechanism
(f) an instruction set suitable for performing bit-, byte-, literal-, and control-oriented operations
(g) a sufficiently high CPU operating speed.
(h) the capability of controlling the interval between two successive digital output signals on the same digital I/O pin to within +/−10 microseconds to avoid loss of synchronicity with a typical stepper motor.

The purpose of box (505) is to receive digitally-encoded commands from box (503) and to translate them into digitally-encoded signals for use by box (507), the stepper motor controllers. These signals are conveyed via the electrical connections embodied in electrical connections arrow (506). Box (507) identifies the stepper motor controllers component. This component is comprised of three integrated circuit chips, one each for the three stepper motors identified in box (510). For box (507), we chose the A3977 controller chip, manufactured by Allegro Microsystems, Inc., but any similar device would be suitable. This motor controller chip has:

(a) an input pin for receiving a digitally-encoded STEP signal.
(b) an input pin for receiving a digitally-encoded DIRECTION signal.
(c) an input pin for receiving a digitally-encoded RESET signal.
(d) an input pin for receiving a digitally-encoded SLEEP signal
(e) an input pin for receiving a digitally-encoded ENABLE signal
(f) an output pin for sending a digitally-encoded HOME state signal.

The purpose of box (507) is to receive various digitally-encoded signals from box (505) and translate them into electrical current of sufficient amplitude and duration to cause the stepper motors to take a step in a rotational direction. Component arrow (508) conveys the currents to the stepper motors indicated in component box (510). These currents are supplied by the power supply in box (509). Component box (510) indicates the three stepper motors needed for tracking and slewing the platform. Each motor in box (510) is controlled by one of the three controllers in box (507). The source of the electrical power for boxes (507) and (510) is a DC power supply indicated in box (509). The power supply may be any readily-available DC source, typically 12 volts, and of sufficient current capacity, which parameters depend on the motor requirements.

FIG. 6 illustrates an overview software flowchart of the logic performed by the PIC18F4550 (hereafter referred to as the USBmP) when 1. the device is first connected to a host computer, or
2. when the device is reset by the host computer Block (601) shows the initialization of the hardware and software necessary to support USB communications with the host personal computer. The initialization is partially embedded within the chip hardware itself, and partially supplied as open source software by Microchip, the chip's manufacturer.

The third portion the USB initialization is performed by computer code written by a programmer skilled in the art. The computer code identifies to the host computer the type of USB device being initialized and the speed at which it will operate.

Block (602) shows the initialization of the stepper motor control logic. The logic is further described in FIG. 7. Blocks (603), (604), and (605) illustrate logic that is repetitively executed. The repetition continues indefinitely until the USBmP device is reset by, or disconnected from, the host personal computer. From time-to-time, as the needs of the USB standard dictate, state changes occur between a host computer and a connected USB device. Examples of state changes are the switching from a connected-state to a disconnected-state, and vice versa. The computer code represented by block (503) handles these changes of state. The computer code is supplied by open source software written by Microchip, the chip's manufacturer. Blocks (504) and (505) illustrate logic performed by the USBmP to manage the stepper motor controllers (see the description of FIG. 5 for a discussion of these controllers), and to manage receipt and transmission of digitally-encoded messages from/to the host computer. FIG. 10 describes the logic in block (504) in more detail, while FIGS. 8, 9, and 12 show more detail of block (505).

FIG. 7 illustrates a software flowchart of the stepper motor control logic initialization in the USBmP. In block (701), interrupts are enabled. This enabling allows the normal flow of control of program logic to be interrupted so that high-priority events may be processed.

In block (702), the USBmP timers are initialized for stepper motor operations. Each of the three stepper motors in the platform has an associated USBmP timer. Each timer causes an interrupt to occur whenever it is time for its associated motor to take a step. FIG. 15 illustrates the interrupt logic in more detail. In block (703), the USBmP input/output digital ports are initialized. These ports are used for communication with the stepper motor controllers (see FIG. 5, box (507)). In block (704), the three stepper motor controllers are turned on and made ready to receive digitally-encoded information. In block (705), some miscellaneous initialization occurs. This initialization prepares various counters necessary for proper control of the stepper motors. Finally, in block (706), all three motors are placed in the STOPPED state.

FIG. 8 illustrates an overview software flowchart of the processing of digitally encoded input and output requests from/to the host personal computer.

In box (801), the USBmP is interrogated to determine if a valid USB connection has been established with a host computer. If not, no further action is taken. If yes, then the logic of boxes (802) and (803) is executed. In box (802), if a digitally-encoded message from the host computer is present, it is processed. This processing is shown in detail in FIG. 9. In box (503), if a digitally encoded message to be sent to the host computer is present, the message is processed. This processing is shown in detail in FIG. 12.

FIG. 9 illustrates a software flowchart of the processing of messages received from the host computer in more detail.

In block (901), the USBmP is interrogated to determine if a digitally-encoded message has arrived from the host computer. If not, no further action is taken. If so, then the logic of blocks (902) through (908) is executed. In block (902), the USBmP is interrogated to determine if a digitally encoded message to set stepper motor parameters is present. If not, then the logic of block (903) is executed. If so, then the logic of blocks (904), (907), and (possibly) (908) is executed. In block (903), the USBmP is interrogated to determine if a digitally encoded message to start a slewing operation is present. If not, then the logic of blocks (906) through (908) is executed. If so, then the logic of blocks (905), (907), and (possibly) (908) is executed. The logic in block (904) is executed if a message to set stepper motor parameters is present. FIG. 11 shows more detail of that logic. The logic in block (905) is executed if a message to start a slewing operation is present. FIG. 13 shows that logic in more detail. In block (906), a digitally-encoded error response message is constructed to send to the host computer. This message is only constructed if the host sent a message to the USBmP which could not be processed. In block (907), the USBmP is interrogated to determine if a digitally-encoded response message should be sent to the host computer. If not, no further action is taken. If so, the logic in block (908) is executed to deliver the message to the host using the USB connection.

FIG. 10 illustrates a software flowchart of the processing of stepper-related tasks. The purpose of the logic in this flowchart is to determine which, if any, of the three stepper motors, S1, S2, and S3, should rotate their shafts by a single step. If the logic determines that a motor should take a step, then a step pulse is delivered to that motor.

In block (1001), the USBmP is interrogated to determine if it is time for stepper motor S1 to take a step. If not, the logic in block (1007) is executed. If so, then the logic in blocks (1002)-(1006) is executed. See FIG. 15 for the logic that sets an indicator that S1 should take a step.

In block (1002), a step pulse is delivered to stepper motor S1. The step pulse is delivered to S1 by digitally-encoding a STEP signal to the controller chip assigned to S1. In block (1003), the step count tally for S1 is incremented. In block (1004), the step count tally for S1 is interrogated to determine if S1 has reached a limit stop. A limit stop is imposed on a stepper motor to ensure that the motor's shaft has not rotated beyond acceptable limits. If a limit stop has been reached, the logic in block (1005) is executed. If a limit stop has not been reached, the logic in block (1006) is executed. The logic in block (1005) is only executed if S1 has reached a limit stop. This logic prohibits S1 from taking any further steps. In block (1006), the USBmP timer assigned to S1 is prepared to determine when S1 should take its next step. In block (1007), the USBmP is interrogated to determine if it is time for stepper motor S2 to take a step. If not, the logic in block (1009) is executed. If so, then the logic in block (1008) is executed. See FIG. 15 for the logic that sets an indicator that S2 should take a step. The logic in block (1008) is similar to that in blocks (1002)-(1006) except that all references to S1 should be replaced with S2. In block (1009), the USBmP is interrogated to determine if it is time for stepper motor S3 to take a step. If not, no further action is taken. If so, then the logic in block (1010) is executed. See FIG. 15 for the logic that sets an indicator that S3 should take a step. The logic in block (1010) is similar to that in blocks (1002)-(1006) except that all references to S1 should be replaced with S3.

FIG. 11 illustrates a software flowchart of the setting of stepper motor parameters in more detail. These parameters are sent to the USBmP from the host computer in a digitally encoded message using the USB connection.

The logic in block (1101) interrogates the USBmP to determine if any of the three stepper motors is shutting down. If any of the motors is shutting down, then none of the motors may have its parameters set and the logic of block (1102) is executed. A motor may be shutting down if it has reached a limit stop. See FIG. 10 for the explanation of a limit stop. In block (1102), an error message is generated. The message indicates that set stepper motor parameters processing failed because one or more stepper motors was in the process of shutting down. This message is digitally encoded, and sent to the host computer. If no motor is shutting down, then the logic of block (1103) is executed. This logic interrogates the USBmP to determine if any motor is slewing. If any motor is slewing, then none of the motors may have its parameters set and the logic of block (1104) is executed. In block (1104), an error message is generated. This message indicates that set stepper motor parameters processing failed because one or more stepper motors was in the process of slewing. This message is digitally encoded, and sent to the host computer. If no motor is slewing, then the logic of block (1105) is executed. This logic interrogates the USBmP to determine if the set stepper motor parameters digitally encoded message indicated that stepper motor S1 should be allowed to take steps. If not, then the logic of block (1106) is executed. If so, then the logic of block (1107) is executed. The logic of block (1106) is executed when stepper motor S1 should not be allowed to take steps. The USBmP timer T1, the timer that controls when S1 may take a step, is disabled, and 51 is put into the STOPPED state. In block (1107), the parameters relating to S1 in the digitally encoded message from the host are recorded. These parameters are retained and used to control S1's behavior until the next set stepper motor parameters message is received from the host computer. In block (1108), the behavior of USBmP timer T1 is algorithmically adjusted according to the parameters retained during the execution of block (1107). In blocks (1109) through (1112), the parameters for stepper motor S2 are retained, and the behavior of USBmP timer T3 is algorithmically adjusted in a manner similar to that for S1 and T1. In blocks (1113) through (1116), the parameters for stepper motor S3 are retained, and the behavior of USBmP timer T0 is algorithmically adjusted in a manner similar to that for S1 and T1. In block (1117), the parameters for USBmP timer T2, the timer used to control when a milestone message is digitally-encoded and sent to the host computer, are retained. These parameters are used to compute when the next milestone message is to be sent to the host computer. In block (1118), a return message is generated indicating successful set stepper motors processing. This message is digitally-encoded and sent to the host computer using the USB connection.

FIG. 12 illustrates a software flowchart of the processing of unsolicited messages to the host personal computer. There are two kinds of unsolicited messages that may be sent to the host computer:

a.) Milestone messages
b.) End slewing messages

The messages are described as "unsolicited" because the host computer cannot predict when the messages will arrive. Milestone messages contain digitally encoded data that describes positional information about each stepper motor at the moment the milestone occurred. End slewing messages contain digitally encoded data that describes positional information about each stepper motor at the moment slewing ceased for each motor.

Blocks (1201) and (1204) interrogate the USBmP for the presence of a message to send to the host. If neither a milestone message, nor an end slewing message needs to be sent, no further action is taken. If either a milestone or end slewing message needs to be sent to the host, then the appropriate message is digitally-encoded and sent to the host computer using the USB connection.

FIG. 13 illustrates a software flowchart of the start slewing mechanism. The logic of FIG. 13 is referenced in the text describing FIG. 9, block (905).

A slewing operation may be started for any stepper motor so long as all of the following conditions are met:

a.) there are no stepper motors that are tracking
b.) there are no stepper motors that are slewing
c.) no stepper motor is shutdown or being shutdown
d.) the stepper motor is not already at its slew destination When all of the above conditions are met, a fast stewing operation may be initiated for a stepper motor. These operations are initiated in blocks (1308), (1310), and (1312), and are described in more detail in FIG. 14. FIG. 14 illustrates a software flowchart of initiating fast stewing operations for stepper motors S1, S2, and S3. Slewing operations require that the stepper motor step pulse rates be quite rapid when compared with the step pulse rates for tracking. This rapid step pulse rates cannot be achieved instantaneously. Rather, they are achieved gradually by a process known as ramping. Ramping allows the stepper motor step rate to be increased (or decreased) gradually to not put undue stress on the stepper motor. This stress can cause the stepper motor to lose synchronicity with the USBmP.

The logic for initiating the fast slewing operations is the same for all three of the motors:

1. Calculate the slewing magnitude. This is the distance, in steps, the motor must traverse to reach its stewing destination.
2. Calculate the slewing direction. This will be positive if the stewing destination is greater than the motor's current position, negative otherwise.
3. Based on the slewing magnitude, determine if switching to slow stewing is appropriate. This slow stewing is appropriate when the slewing magnitude is small enough to make the overhead of fast slewing unwarranted.
4. Adjust the stepper motor's associated USBmP timer such that this timer operates at optimal conditions for slewing.
5. If fast slewing, calculate the point at which the rate of step pulses, which are issued to a stepper motor, must be reduced such that when the destination step count is reached, this rate is zero.
6. Indicate the state of the stepper motor as slewing.

FIG. 15 illustrates a software flowchart of interrupt processing for timers T0, T1, T2, and T3. An interrupt signal is generated to the USBmP when any of these timers completes a timing operation. These interrupt signals cause the USBmP to interrupt its normal flow of executing instructions and to give control to a section of executable code specially designed to service interrupts. When this section of code (illustrated by FIG. 15) has completed processing the interrupt(s), the USBmP returns control to the executable code that was originally interrupted.

USBmP timer T0 controls the step rate for stepper motor S3. When the operation of T0 generates an interrupt, an indicator is set for S3 to take another step. This indicator is interrogated by the logic described in FIG. 10, block (1009). Similarly, USBmP timers T1 and T3 control the step rates for stepper motors S1 and S2, respectively. When timers T1 and T3 generate an interrupt, indicators are set for S1 and S2 to take another step. These indicators are interrogated by the logic in FIG. 10, blocks (1001) and (1007). USBmP timer T2 controls when a milestone message should be digitally encoded and sent to the host personal computer via the USB connection. When the operation of T2 generates an interrupt, an indicator is set to generate and send this milestone message to the host. This indicator is interrogated by the logic in FIG. 12, block (1201). Before the USBmP returns control to the executable code that was interrupted, any timer that generated an interrupt is restarted. This restarting ensures that step pulses continue to be sent to their respective stepper motors at regular intervals, and that milestone messages continue to be sent to the host at regular intervals.

Operation—Calibration
An Important Property of the Mechanism of FIG. 1, which is Also True of Hexapods These mechanisms are set apart from mounts and platforms with axes that are analogs of spherical coordinates for the following reason: A computer programmer, looking at FIG. 1, can write the code to control any embodiment thereof, without knowing where the anchor-points are located, because the algebra is independent of these locations. Gross departure from the blueprint in constructing an embodiment may cause arithmetic singularity or poor accuracy when the code executes. As long as singularity is avoided, there is no uniquely "correct" placement of anchor-points. Calibrations determine errors in the blueprint, rather than errors in anchor-point locations. By contrast, if analog mounts design assumes that some axis is orthogonal to another axis, small machining error here can have serious consequence. Instead of repair, a theory can be added to the code to deal with the error. The astronomical spherical coordinate systems, which the analog mounts image, are idealized. The computer code images the ideal, defined system.

Stepper Counts to Stage Position

Those with ordinary skills in vector geometry will understand that if the rotation matrix, relating base to stage coordinates is known, the actuator lengths are simply computable using Pythagoras's theorem, because the anchor-points are known in these systems.

The converse problem occurs in calibration: We observe actuator lengths by interrogating, for example, stepper motor counts which satisfy some external condition like the stage being level or when the telescope is pointed at a star. We need to determine the corresponding rotation matrix that transforms base vectors into stage coordinates, or conversely.

We make no claim with respect to the method of doing this, but because of the importance of doing so to the successful use of the present embodiments, we disclose, in language that will be understandable to those of ordinary skills in three-dimensional vector geometry, a method we have used:

We determine the partial differential coefficients (pdc) of changes in actuator length with respect to Euler angles. Finite difference methods are sufficiently accurate. These, placed in a 3×3 matrix, which is inverted by a method like Gauss-Jordan because it is not a rotation matrix. Call it the pdc matrix. Another matrix needed is one in which Euler angles of 0,0,0 will yield a unit rotation matrix between the base and stage for which the actuator lengths will be their setup values. Inverting the pdc matrix, we use linear algebra to calculate the changes of Euler angle needed to change the actuator lengths to the measured values, and then compute the resulting rotation matrix from its Euler angles. We use this rotation matrix to represent the actuator lengths using the method of the previous paragraph. Initially these lengths will not yet be correct so the entire process is reiterated, including the finite difference determination of the corrected partial differential coefficients, to remove the residual errors, by computing the changes of Euler angle needed to remove the residuals. This procedure will converge to the measured values in 7 or 8 iterations. The Euler angles used are only required to determine the rotation matrix uniquely. They are otherwise uninteresting and discarded once they have served their purpose. If we chose a different set off Euler angles or a different commutation order of the same set, we would have different partial differential coefficients but will end up with the same rotation matrix. This is true because this matrix is uniquely determinable from the actuator lengths in the mechanism of FIG. 1 when designed to be free of indeterminacy or redundancy in the range of the actuators.

Actuator Length Calibration Assuming Micrometer Screws Driven by Stepper Motors

It will be obvious to those with ordinary skills in metrology that some calibration must be done to ensure that the actuator lengths are determinable from a number, like a stepper motor count. The actuators are shown as 121, 122, and 123 in FIG. 1.

The following description, given for the sake of completeness in the specification for the example of a worm driven micrometer barrel, will be understandable to those with ordinary electro-mechanical skills.

While other obvious ways of calibrating actuators are possible, we describe a method of actuator calibration we have used. The mid-range actuator design length, between the inner universal joint pins, is set in a jig on the bench to the design value. The stepper motor then turns the worm until a nub on the worm gear closes (say) a machine-readable sense switch. The stepper motor is advanced until its controller reaches the next proximate 'home' state defined to be the state the controller enters when first powered up, which is also machine readable. The micrometer nuts are adjusted until all slack is removed and then they are locked. Two nuts are used to eliminate backlash. The stepper motor count tallies are then set to zero.

The above procedure ensures that a known linear relationship exists between the stepper motor accrued count and the actuator length between the universal joint centers, provided no relative rotation exists between the micrometer barrel and its screw, which the aforementioned jig ensures during setup.

Assuring Calibration of the Actuators in Operation

In operation, the actuators are returned to the zero step count values before turning off power. To ensure against creep in transportation we prefer hybrid stepper motors, but also take the following precaution: When next powered up, the worm is backed off until the sense switch opens, then advanced until the switch turns on again and advanced further to the next 'home' state of the motor controller, which is machine-readable. The stepper motor pulse counts are set to zero. Repeatability is thereby ensured. The same procedure is followed for all three actuators.

Stage Level Calibration

Following methods used by surveyors for centuries to align theodolites, an axis of the internal system, call it the Z-axis, can be aligned with the vertical using a spirit level or device of similar functionality.

Unlike theodolites where accurate factory alignment is required of the spirit level with the internal analog azimuth axis, the manufacture of the mechanism of FIG. 1 and its embodiments require no such high accuracy alignment between the spirit level and the actuator anchor-points that are the reference points for the stage internal coordinates. However, the spirit level is rigidly mounted to the stage so that measurements are repeatable. A calibration procedure that need only be done once ensures that the nominal horizontal is exactly horizontal when the spirit level is centered.

A Property of the Non-Analog Mechanism

The internal coordinate system of the stage can be redefined using the results of observations of a plurality of stars to find corrections to those blueprint coordinates of the actuator anchor-points of the stage, which minimize the errors of observation. Once these corrections have been found they may be applied permanently to the system database so that this spirit level alignment need not be repeated unless the platform is disassembled and reassembled, which may change the affected coordinates.

Thereafter, a level stage as indicated by the spirit level means that the XY plane of the stage coordinate system, given the corrected defining coordinates in the system database, is horizontal when the spirit level bubble is centered. We can do this because the coordinate system is established by definition of three coordinates, which definition we are free to change, unlike an analog mechanism where the coordinate system is defined by mechanical axes of rotation.

Calibration Determining North in System Coordinates

The setup of surveyor's theodolites and astronomical telescopes requires establishing the relationship between standard coordinates such as, altazimuth, and the coordinate system of the instrument. Unusually, true north is used as an index in azimuth, although sometimes south is used.

We make it a requirement of our embodiments that the operator not be required to know the direction of true north when placing the base on the ground: No analog device in the mechanism exists which requires azimuthal orientation. However, in order to track stars, a relationship must be established between the internal coordinate system and the external coordinates such as the altazimuth system. This is true of every telescope mount used to track stars. This relationship ties into astronomical coordinates, such as the Earth bound hour angle/declination. The calibration to establish this relationship uses objects of known position such as surveyor's beacons or monuments or an astronomical object.

The obvious choice for a calibration of an astronomical telescope mount is to use stars. This calibration requires as input data the observing site latitude and longitude, the identity of the observed star and the time of observation. Beyond a basic understanding of positional astronomy, understanding our embodiments does not require an understanding of the intricacies of positional astronomy in order to calculate the apparent places of stars. Open source software to perform this service can be downloaded free from the Internet, with normal courtesy accorded to the authors (The International Astronomical Union and the U.S. Naval Observatory). This software must be supplied with times, derived from an accurate computer internal clock, of an observation of a catalog star given the observer's location: The astrometric software delivers the apparent position of the star. A star catalog in a form required by the software must be provided. The needed calibration is one that determines the azimuth of true north in system coordinates or equivalently the azimuth of the level stage X-axis in altazimuth coordinates.

Departure from Prior Art Calibration

Even where hexapods have been used, the telescope generally will have a known pointing direction in stage coordinates where 'stage' refers to the body supporting the telescope. In the embodiments of FIG. 1 we make no such requirement. A Dobsonian mounted telescope may be pointed anywhere with no communication with the host computer controlling the embodiment of the FIG. 1 machine being required. Nevertheless, we must use the this telescope to calibrate the system coordinates. This is a marked departure from calibration procedures generally used in the prior art.

True North Calibration Using One Star

One star can be used for this calibration if we trust the accuracy of alignment of the Dobsonian (say) altitude axis with the internal stage coordinate system. If not we must use two stars because we do not know the pointing direction of the telescope in system coordinates. We refer to Dobsonian mounts here as a typical example of an aiming device. Even if we are using the two-star method (described below), the single star method is useful to get an approximation to north azimuth.

Procedure of the 'One Star Method'

We choose a star and point the telescope at it and we press a button on the paddle causing the computer to mark the time. For many purposes, the finder will be sufficiently accurate and these telescopes always have crosshairs. Pursuant to the one star method, we move the telescope about its own mount axes in altitude but keeping the star in the field of view avoiding any motion in azimuth. We return the star to the crosshairs using the paddle buttons that control the FIG. 1 embodiment platform actuators and mark again. If the system X-axis were pointed fortuitously in the direction of the star, the motion needed would be a pure rotation about the Y axis and the system azimuth of the star would be 0 or 180 degrees depending on the sign of the required motion. If the Y axis were pointed at the star a pure X rotation would mean the azimuth of the star in system coordinates is 90 or 270 degrees, depending on the sign of the required motion. The following will be evident to those with ordinary skills three-dimensional geometry and positional astronomy. If rotations are needed about both the X and Y-axes to bring the star onto the crosshairs, the relative amount of rotation is mathematically relatable to the azimuth of the star relative to the cardinal points 0, 90, 180, 270 described above. When we know the azimuth of the star in the FIG. 1 embodiment system coordinates, we can determine the system azimuth of true north in system coordinates at mark time because we know the apparent azimuth of the star at mark time relative to true north, which is supplied by astrometric software.

True North Calibration Using Two Stars

A more accurate method of determining north in system coordinates, that does not depend on the accuracy of the telescope aiming mechanism, or its alignment with the stage coordinates, requires a selection of a second star differing as much as possible in altitude from the first. The difference in azimuth is mathematically irrelevant. However, it should not require stewing through a large angle unless it is principally a difference in altitude.

The following discussion will be understandable to those with ordinary skills in numerical analysis and positional astronomy: We establish an identity containing only one unknown: the azimuth of true north or a rotation matrix rotating by that angle about the vertical axis of the level stage. Transposing this identity to one side of the equation yields a function that is non-zero for every azimuth except that of true north and having a root only at true north. We require the properties of the identity to have a root at a node of the function, not a loop, and not to change sign at the root, which would imply another root elsewhere and an ambiguity to be resolved. Because the azimuth of true north is assumed to de completely unknown in system coordinates, it is necessary to calculate the function at several points around the azimuth circle. Once the approximate location of the root is known, the exact root can be found by using established methods of numerical analysis. This identity is:

$$|S_1||P\sim||A||q_1|-|S_2||P\sim||A||q_2|=|0|$$

Where $|P\sim|$ is the inverse of the matrix relating the level stage to the base coordinates, $|S_1|$ and $|S_2|$ are matrices computable form the actuator lengths when the telescope is pointed at stars 1 and 2 and $|q_1|$, $|q_2|$ are known vectors computable from the known apparent star positions. Hence, all of the elements of the above equation are known except the matrix $|A|$, which rotates about the Z-axis, by the azimuth of true north. $|A|$ itself is unknown except as it satisfies the above identity. $|0|$ is the null vector. This method has great mathematical accuracy allowing the azimuth of true north of to be determined by two stars of any azimuth difference even when the altitude differences are as small as 1 arcsecond. In practice, much larger altitude difference is necessary because of observational error. This is summarized in FIG. 17A.

Notwithstanding the mathematical accuracy of the above method, it greatly magnifies observational error in setting on the stars if they are near the horizon. The altitudes of the stars need to be as high as reasonably possible. The above identity is not satisfied exactly if there are errors of observation of the stars. Instead of looking for a root, we must find a minimum, i.e. the values of the azimuth of north giving the matrix |A| that makes the length of the vector on the right hand side of the equation a minimum.

Figures 17, 17A, 17B:
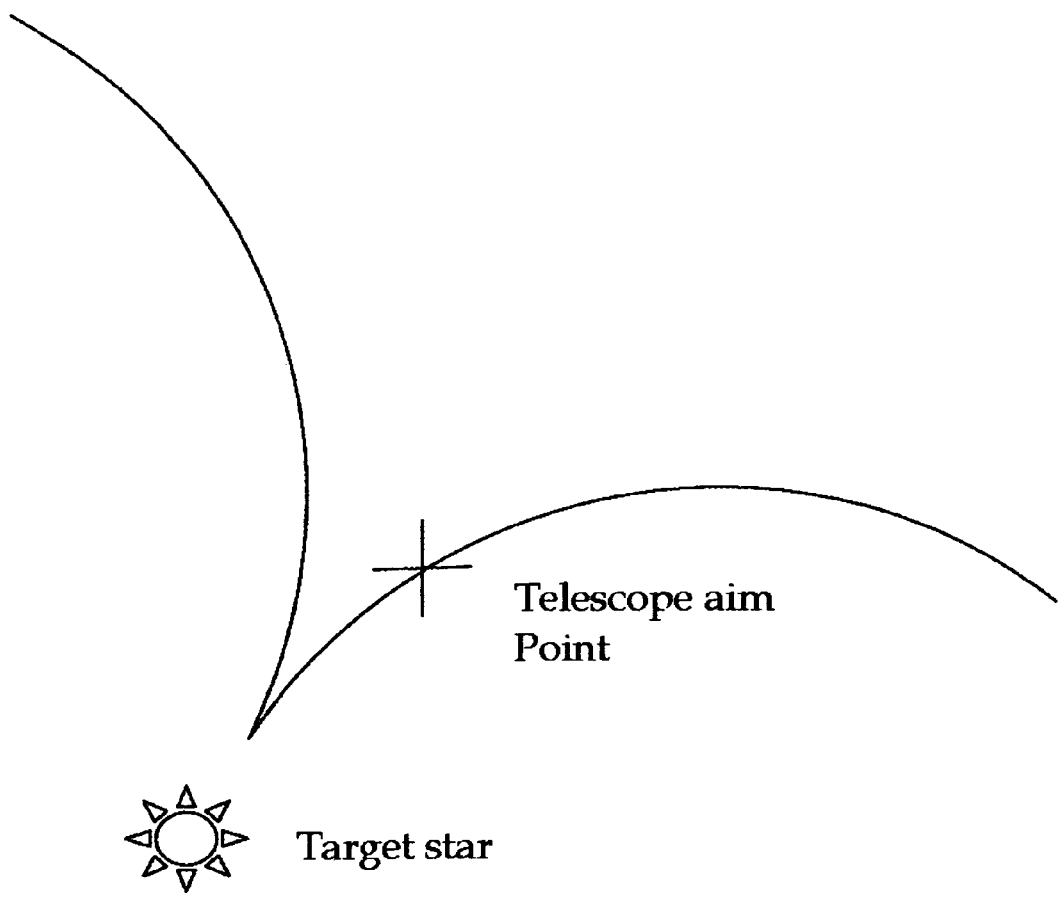
FIG. 17. Cardioid sweep of the telescope aiming point relative to a target star calibrating the azimuth of true north.

The following variation of the method greatly simplifies the implementation of the method and avoids inaccuracies of setting on the second star. It is depicted in FIG. 17B. After the second time mark of the 'one star method' described above, the telescope is slewed to the second star automatically at the highest motor speeds. This requires approximate knowledge of the direction of north in system coordinates. We use the approximate value derived from the "one star" method. After the slew, the crosshairs doubtfully will be centered on the second star, but close to it. Instead of forcing the crosswires to star 2, we give the operator joystick control to vary the trial azimuth of true north. Continuously changing the trial value of this azimuth will cause the pointing direction of the telescope defined by the crosshairs to move in a cardioid curve with a cusp pointing at the second star as depicted in FIG. 17. The cusp will touch the star if there are no errors such as error in pointing at star 1 and system errors. Otherwise, it will move to a point of closest approach at which point the mark button is pressed which causes trial value of the azimuth of north to be captured. If an approximate azimuth of North is available using the "one star method" described above, diurnal tracking can be in effect during this calibration making the calibration easier and more accurate. Diurnal tracking is described below.

Known Stage Position to Actuator Lengths

When the telescope is calibrated and tracking, the stage position is defined by a rotation matrix, which allows computation of the base anchor-points in the stage system. Subtraction of these transformed base coordinates from the corresponding stage anchor-point coordinates gives the jack vector coordinates. Following the theorem of Pythagoras, the square root of the sums of the squares of the components of this vector gives the vector length, and hence actuator length, between anchor-points in the base and stage. Without going into mathematical detail, the operations described require 12 multiplications, 8 additions, and a square root, which can be done on a time scale of microseconds on modern personal computers. When stepper motors are used to power the actuators, these lengths are translatable into the motor pulse counts to mechanically move the stage to the desired position. These stepper motors can be driven by pulses generated by inexpensive universal serial bus (USB) microprocessors which cannot bear the additional burden of doing the geometric and actuator length calculations; the personal computer running a multitasking operating system cannot generate precisely timed motor pulses because of latency. A synergistic relationship between the two machines is required, which overcomes the latency of the USB channel and the latency of the personal computer multitasking operating system.

Latency Problems in Calibrations Involving Observations of Stars

When a star is observed for calibration purposes three events must occur simultaneously.
1. The telescope is pointed in a known direction in system coordinates;
2. The star is in that direction;
3. The time of pointing at the star must be known exactly.

When a computer paddle button is pressed, while looking at a host computer clock display, there can be a considerable disparity of a significant fraction of a second in the observed mark time and a computer listing of the computer clock at mark time arising from a combination of latency of the operating system and USB device. Diurnal motion is 15 arcseconds per second of time, thus an error of several arcseconds can be incorporated into the observation assuming the computer clock is accurate. Even if time is set from the Internet, errors of 0.2 seconds in setting the clock can occur. For visual tracking, considerations of errors of this magnitude would be overkill. However, platforms like our embodiments are in principle capable of tracking to an accuracy of a few arcseconds over a photographic exposure of at least an hour, if not three hours, obviating the need for an expensive autoguider.

We can achieve highly accurate observations of stars unaffected by latency by equipping the USBmP electronics board with a GPS receiver that emits time pulses at 1-second intervals. These pulses are relatable to Coordinated Universal lime (UTC), and hence to various astronomical time standards, to an accuracy of 1 microsecond. These very accurate times derive from atomic clocks aboard the GPS satellites.

We follow this procedure:

An approximate calibration has been done which will make diurnal tracking accurate over at least a few of the aforementioned milestones.

Controlling the platform motors, we set the crosswires on the target star. We may have this done automatically by controlling the motors in a way that moves the star image onto the central pixel of a webcam. Diurnal tracking is in progress while this happens.

We mark correct aim by pressing a designated button on the game controller we call a paddle. This information uses the USB channel with consequent latency. If a webcam is being used, the software reading the webcam image is programmed to issue such a time mark automatically once the star has been acquired and centered. However, this also involves USB latency.

The mark events of the previous paragraphs do not directly make note of any time, but cause the host machine, which coordinates USB messages, to send a message to the motor controller USB processor (USBmP). This processor is programmed to read the stepper motor counts at the next second's pulse from the GPS receiver. This data is sent to the host. The host is thus required to know the UCT of the event, which it can do by interrogating the GPS device using the motor controller USBmP as a relay station to get the digital identity of the time mark.

The UTC of the time of observation and the star identity is supplied to astrometric software, which returns the apparent place of the star. The calibration data is thus an exact correspondence between the apparent place of the star and the actuator lengths computable from the stepper motor counts at the moment of observation which is known to an accuracy measured in microseconds.

The requirement that the above procedure succeed is that tracking will keep the crosswire on the star for a long enough interval of time that any mark time in that interval will be as good as any other provided the instant the current stepper motor counts are read corresponds to the accurately determinable apparent place of the star. By making this accurate tracking embrace several seconds of time it will embrace some precise 1-second mark of UTC from the GPS receiver. We do not care which second, as long is its digital identity can be supplied to the astrometric software.

The procedure described above obviates the need for a special latency free communication channel between the operator and the USB motor controller microprocessor.

Multi-Star Calibrations

With the mechanism of FIG. 1 and its embodiments, the method of doing such calibrations using a plurality of stars is very different from traditional multi-star calibrations done in astronomy, for two reasons:

1. We do not require the aim direction of the telescope in system coordinates to be known, a priory, to the host computer. In other words, the telescope aiming mechanism has degrees of freedom not required to be known to the host computer of our platform system.
2. The observables, which are three actuator vector lengths, have three degrees of freedom but the direction of pointing at a star has only two.

Aiming the telescope at a star, because of 1 above, provides no useful calibration information except to tell us the system coordinates aiming direction at some time for which the stars apparent place is known. However, if we move to a second star using the platform motors, without moving the telescope about its independent axes, we can get useful information about the system calibration if moving the platform by a theoretically calculated amount did not successfully move the telescope to point exactly at the second star.

We cannot assume that any change in actuator lengths that makes the telescope point at the next star are uniquely related to the errors in the parameters of the system we are trying to calibrate. This assumption is only justified if we know we did not rotate the telescope about its aiming direction by an unknown amount, which is possible because of 2. above. Such a rotation will in general change all the actuator lengths. This change will be unpredictable if we have no way of separating it from those referred to above that were necessary to correct errors of calibration.

Figure 19:
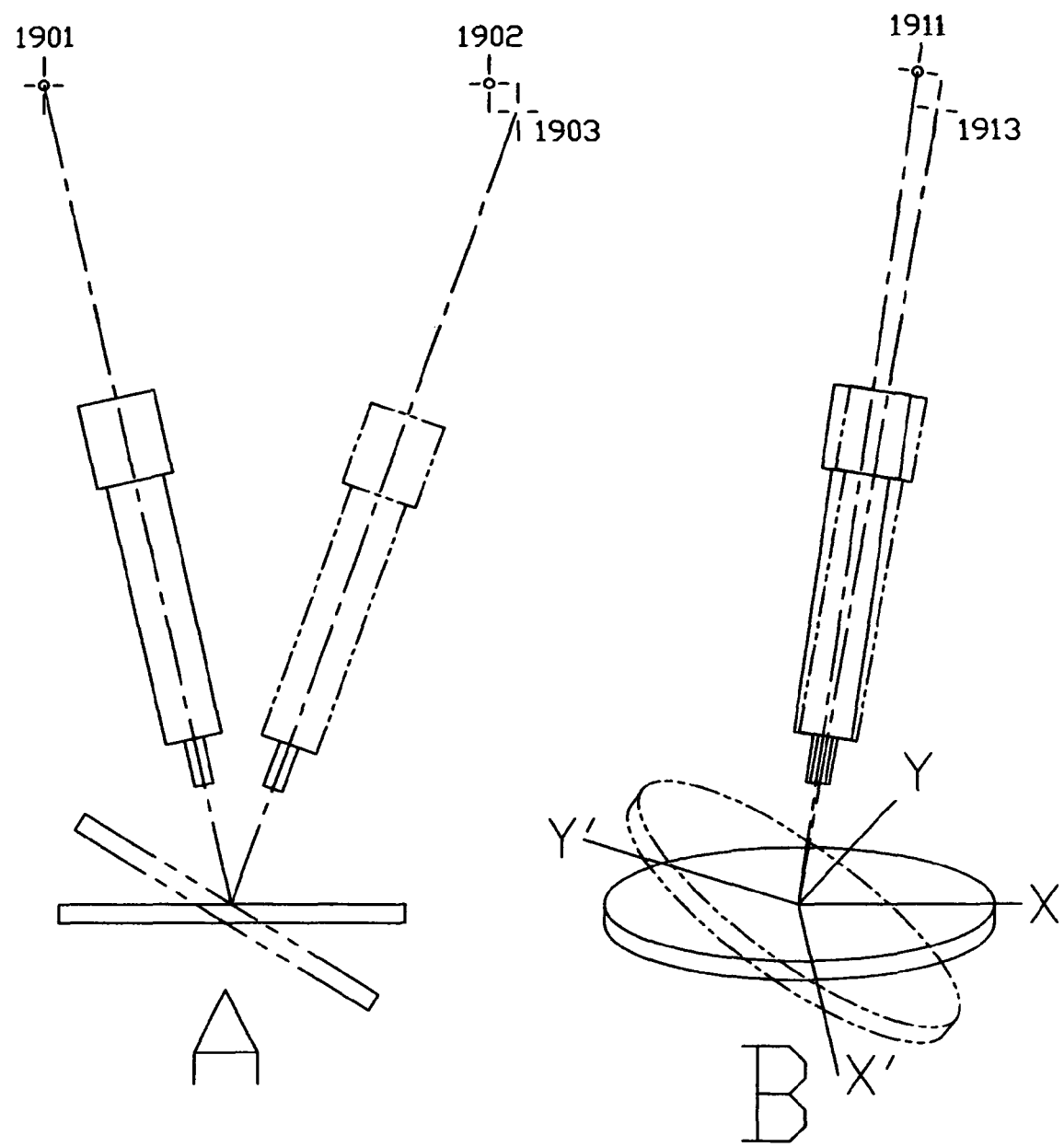
FIG. 19 Calibration techniques of the FIG. 1 mechanism with 3 degrees of freedom, using star pairs or single stars selected from a plurality of stars.

Those with ordinary skills in three-dimensional vector geometry will understand that inadvertent rotation can be avoided by only by moving the aim direction in a great circle from one star to the other, which is equivalent to rotating the stage about an eigenvector of the needed rotation matrix. This operation is depicted in FIG. 19 diagram A. The telescope initially points at star 1, 1901. Assume star 2, 1902 is in the plane of the paper. We rotate the stage, about an axis perpendicular to the paper, through the known angle between the stars 1901 and 1902. Due to the errors we are calibrating, the telescope points instead at point 1903. The discrepancy in actuator lengths between points 1902 and 1903 are related to the errors we seek to determine. There are established methods of numerical analysis of solving for the unknown errors, given a sufficiency of observations; hence the need to observe a plurality of stars. See Modeling of data in Numerical Recipes (Press, Teukolsky, Vetterling, Flannery).

Observations of the Same Star

However, item 2 above provides us with a remarkable way of deriving useful calibration information from a single star. The method has no counterpart in the calibration of alt/azimuth and equatorially mounted telescopes, with two degrees of freedom. In this case, instead of slewing to another star without rotation, we rotate the stage and hence telescope about a significant angle about the direction of a single star. Doing so in general will change all three actuator lengths. If the system is in calibration, the telescope will remain pointed at the star. We assume that diurnal tracking is in effect. If we are not pointed at the target star, we are justified in assuming that the corrections in actuator lengths to point the telescope exactly at the star are related to the errors in the parameters requiring calibration, but only if the rotation was pure and there was no displacement which would introduce unpredictable actuator length changes. i.e. if they could not be separated from those caused by the parameter errors we are trying to determine.

This procedure is depicted in FIG. 19, diagram B. Here the telescope initially points at the star 1911. We rotate the stage about a considerable arbitrary angle about the theoretical direction of the star. If the system is in perfect calibration, the telescope will remain pointed at the star 1911. Instead it points at point 1913 after the slew. The discrepancy in actuator lengths between points 1911 and 1913 is related to the errors we seek to determine in the same way as discussed above for two stars. This type of calibration has no counterpart in two-degree of freedom telescope mounts.

Either moving the telescope to another star, or rotationally slewing it to the same star will take some seconds and will involve star displacement due to diurnal motion. Diurnal motion of the star, in the short time it takes to do the slew, will be small and predictable but not ignorable. However, we are justified in ignoring, as being of the second order, any correction to diurnal motion due to errors in the parameters the calibration is seeking to determine.

What Plurality of Stars Calibrations Accomplish with FIG. 1 Embodiments

The end result of the above calibrations involving a plurality of stars is to find corrections to all blueprint values of the system database coordinates of anchor-points. Included are those that that define the coordinate system insofar as doing so makes the XY plane of the stage coordinates level when its spirit level is centered. This calibration also provides an accurate determination of the system azimuth of true north. With the exception of the calibration to determine the direction of North, once the system database has been updated, these calibrations need not be repeated unless the apparatus is disassembled and reassembled in a way that may change component locations. Subsequently, the only star calibration needed is that which determines the azimuth of true north in system coordinates. Unless the installation is fixed, it generally varies from one observing run to another Operation—Diurnal Tracking Setting Up a Tracking Arc It will be evident to those with ordinary knowledge of three-dimensional vector geometry that:

after the basic calibrations of stage leveling which gave a matrix we call |P| which transforms vectors in the base coordinate system to the level stage system;

after the determination of the azimuth of true north calibration;

because the site latitude is known, we can set up a matrix we call |E| that transforms vectors referred to the level stage to the hour angle/declination system. With these two rotation matrices |P| and |E| we can transform the base and stage anchor-point coordinates to the hour angle/declination system.

If we use these transformed values of the anchor-points to calculate the actuator lengths we will get exactly the same numbers as we got from the stage leveling calibration, because we have not moved anything mechanically. We are simply looking at anchor-point coordinates in a different coordinate system: These vector lengths between anchor-points are invariant in any system.

However, we now do want to move the stage to the start of a tracking arc, by rotating the stage 30 minutes of time east, say, in hour angle. We compute the rotation matrix to do so and use it rotate the stage anchor-points, but not the base, in the hour angle/declination system. We now compute the actuator lengths that correspond to the rotated stage and command the actuators to slew to these lengths at high speed. The stage will follow no interesting trajectory in doing so but after each actuator motor has reached its destination, the stage will be at the desired start of the tracking arc. The above description gives the principles involved: We have glossed over technical details. The platform may not be on level ground and we may wish to maximize the tracking arc by exploring numerically how far east and west of the meridian we can slew without running into actuator software limit stops. In practice, one takes into account such detail.

The tracking Arc

Because we can move the stage to any Hour Angle within its range of motion as described in the preceding paragraph, in principle we can move the stage in a sequence of hour angle values required to track diurnal motion. A detailed discussion of how this is done follows the discussion of the latency problem below. Nothing in the foregoing implies any difficulty in dealing with the latency of the host computer multitasking operating system except that the button press on the game controller, to mark the observation time of a star, passes through a USB port. The solution to this problem is given below under the Solving the latency problem heading.

Recalibration During Tracking

The embodiments of the FIG. 1 mechanism allow us to steer the telescope from one interesting object to another without additional machinery. For example, an observer looking at a lunar crater may move the telescope to a different crater. If, while tracking, the telescope mounted on a platform of design shown in FIG. 1 and its embodiments is moved, or slewed, as we shall say, using the actuator motors, the calibrations described above will be corrupted. This corruption will not be much if the telescope is not slewed much. However, such corruption cannot be tolerated indefinitely and must be corrected in an expeditious way. In other types of telescope mounts, this problem has obvious solutions. In equatorial mounts, the telescope may be moved arbitrary amounts in declination without affecting tracking. In Right Ascension, the slewing velocity is algebraically added to tracking velocity, which is constant. With altazimuth mounts, the pointing direction of the telescope can always be read in principle from angle encoders on the azimuth and altitude axes and a procedure called to return the current tracking speeds, which are added to the slewing speeds. With hexapods, the problem is more complicated but the telescope will have a known pointing direction in stage coordinates. The needed motions in tracking and slewing of the pointing direction are mathematically relatable to the motions of the actuators.

However, the software controlling the FIG. 1 embodiments does not require the telescope pointing direction to be known to the control computer. This computer can do no better while stewing is occurring than to use the last known tracking motor velocities and accelerations in computing the tracking contribution to in the change of length of the actuators. Slewing may be demanded by external circumstances like moving the telescope to another object, which the operator does by trial and error control of motor velocities, which in our experience is quite easy to do. When Slewing ends, the platform will be continue tracking but with somewhat incorrect motor speeds and requires recalibration. The method doing this without disrupting observations was not obvious to us. Because of its importance in the successful use of our control software, we disclose below this method in language that will be understandable to those with ordinary skills in the linear algebra of three-dimensional geometry.

When the operator ends slewing to a nearby object, even if momentarily, the host computer transmits a USB interrogation to the USB microprocessor requesting the status of the actuators. From the actuator lengths the host computer sets up a rotation matrix $|Q|$ that transforms base anchor-point coordinates into those of the current stage position. This is done in the same way the host computer set up the corresponding matrix for the level stage which matrix which here we called $|P|$ above. Define a new matrix $|R|$ such that $|Q|=|R||P|$.

Under the title 'Setting up a tracking arc' above we described a method of determining a matrix which we called $|E|$ that transforms coordinates in the level stage to the Hour Angle/Declination system. We used $|E|$ to transform stage coordinates into this system and $|E||P|$ to transform base coordinates into this system.

Define a new matrix $|F|=|E||R\sim|$ where $|R\sim|$ is the inverse of $|R|$.

We can now use $|F||Q|$ in the same way we used $|E||P|$ to transform base coordinates into a polar system and use $|F|$ to transform stage coordination into that system. By polar we mean a system in which a pure Z rotation emulates diurnal motion. With such a rotation, we can transform stage anchor-point coordinates to their diurnally rotated position to calculate the actuator vector lengths to make the stage follow a diurnal tracking trajectory. Note that a zero Z rotation in the new system leaves the stage in the position described by $|Q|$. In other words, polar rotation is measured from the interrogated state of the actuators after slewing ended, and not from the meridian as hour angle is measured. Otherwise, it is a rotation about an axis parallel to the polar axis of the Earth.

Tracking Despite Latency of the USB Communication Link Between the Host Computer and the USB Microprocessor We discuss here the embodiment of the mechanisms of FIGS. 1, 2, 3 which assumes the actuators are stepper motor driven. Stepper motors provide accurate metrology and motive power in a single inexpensive package. Sophisticated electronic controller chips to provide the necessary electrical current drive for these stepper motors are readily available at relatively low cost. Inexpensive programmable USB microprocessors are also readily available to provide the operational electronic input requirements of these controller chips. These USB microprocessors are available with timing facilities (called timers) that can be used to measure the interval between step pulses and hence control motor speed. Additional timing facilities of these USB microprocessors may be used as a sidereal clock to time motor pulses without the intervening latency of a USB channel. This timer is not required to run at a metrologically precise sidereal rate as long as the host computer has been supplied with correction factors to solar time and hence to sidereal and lunar rates. These scalable rates enable a telescope on the platform to track stars or the Sun or the Moon without ephemeredes for these objects.

The host computer, supplied with knowledge of the USB microprocessor's timing capabilities and the geometric and mechanical parameters of the FIG. 1 embodiment, can compute motor speeds required by the astronomical requirements. It can deliver this information to the USB microprocessor to cause the motors to run at the correct tracking speeds. This information is delivered to this microprocessor using a USB communication link between the host computer and the microprocessor. For the host computer to send motor pulse commands over the USB would introduce disastrous error because of the damage to pulse timing caused by latency.

The following description will be understandable by computer programmers. Experimenters have used personal computers to control stepper motors driving the worm gears of analog mounts only by using a non-multitasking operating systems such as IBM-DOS in which the astronomical application has complete control of the machine. Motor commands are sent over the RS232 or parallel printer port of the machine to stepper motors with reduction gearing to prevent step jerk in which backlash has been avoided by using notched belt drives. Many modern personal computers are no longer made with these ports and multitasking operating systems are standard. Complete application control of the personal computer is prohibited with these operating systems. The standard communications port of personal computers has become the universal serial bus. (USB). External communication is done using the USB port or local area network, Ethernet ports or wireless links. These developments prohibit the generation of stepper motor pulses in the host computer.

Where such motors are used such as in printers, for example, the latency of the USB channel is irrelevant because the transfer of complete line(s) of print to the printer is made before printing begins and stored in a buffer: The timing of events within a print line are purely internal to the printer USB microprocessor. In principle, a similar approach could be made in the astronomical case at the expense of requiring considerable writable memory in the USBmP.

Summary of the Latency Problem

Positing the astronomical code in a USB microprocessor is not feasible with inexpensive processors, because their arithmetic capability is severely limited: for example, they may lack a divide instruction, not to speak of a complete lack of hardware transcendental math functions, which are operations crucial to astronomical calculations. Positing the motor control code in the host computer running a multitasking operating system is also not feasible because the latency of the USB channel would result in severe error in the timing motor pulses or motor coil current phases. An obvious solution would be for the host to send predicted positions to a USB microprocessor, which stores them in a buffer. An internal clock associated with the USB microprocessor executes the positional commands at a rate independent of the latency of the USB communication link. This scheme only works if the host can predict exactly all errors that may occur. The numbers loaded into motor speed timing registers are rounded integers and not mathematically exact. The timing of events in the USB microprocessor is asynchronous. The solution we claim that addresses these issues follows.

Solving the Latency Problem in Tracking

We have found a solution to the latency problem, at least as it pertains to the embodiments of the FIG. 1 mechanism controlled by a host computer running under a multi-tasking operating system. It assumes that the actuator motors are stepper motors controlled by a USBmP that is required to have no greater arithmetic capability than single byte addition. The core of the method is to give the USBmP predictive capability over a short interval of time that is much longer than the latency interval. This avoids the requirement that it have the powerful capabilities of high accuracy vector arithmetic and transcendental math functions like the trigonometric functions. This method borrows from the predictor component of a 19$^{th}$ century technique called predictor-corrector numerical integration. The predictor scheme predicts a simple list of numbers that is predicted by the USBmP but is seamlessly replaced by the host computer in a way that allows the host to monitor the tracking performance of the USBmP and correct any errors before they become significant.

FIGS. 5-15 show the host and USBmP code performing these functions. The detailed functionality of this code is described under DETAILED DESCRIPTION OF THE DIGITAL CONTROL FUNCTIONS above.

Details of the Latency Avoidance Scheme

Initially, latency will only delay the time tracking starts slightly, which is of no consequence to the observer who would not be aware of any delay. The latency problem starts doing damage when the host must update motor velocities, because the motors will run at the wrong speed for some unpredictable period of time. There are other sources of error. The USB timer and the stepper motor pulse timers run asynchronously. The counts loaded into the count down timers are rounded numbers. Reloading must wait for the current countdown to expire. The host may send updated velocity related information, which arrives just before one stepper counter times out but just after another timer is loaded with the previous timer interval.

For visual observing, high accuracy considerations may be overkill, but our system objectives also aim to accommodate astrophotography without autoguiders where arcsecond accuracy may be demanded, because the mechanism of FIG. 1 is capable of such accuracy using standardized components and ordinary workbench accuracy of construction.

Four Critical Time Intervals Characterize the Latency Problem:

1. The timing of motor pulses require microsecond accuracy at high motor speeds and millisecond at low. This timing cannot tolerate latency.
2. The time the motors can be run at constant velocity and still maintain tracking accuracy. This interval is of the order of 1 second at high accuracy and 1 minute for visual observing.
3. The milestone interval. The time interval between communications from the host to the USBmP designed not keep the latter machine so busy that it cannot do its motor related duties in a timely manner.
4. Latency window. Inside this window the host must:
   receive current motor positions from the USBmP at the expiration of each milestone, as timed by the latency free sidereal timer of the USBmP;
   compute the velocities to reach the next exact milestone position, starting from the position at the expiration of the last milestone which may include some error;
   encode this information in a compact message;
   send it to the USBmP to arrive before the expiration of time window 2 above.

Sending countdown tallies for the stepper motors updated at very frequent intervals also is not feasible. When the USBmP receives a package from the host, it cannot ignore it. Communication from the host computer takes priority over all functions except the reload of a USB timer, which is very fast, and of necessity has higher priority. With the processor we tested, when communications from the host occur more frequently than about once a second, the host usurps so much of the USBmP time that performance is damaged. When a motor pulse interval timer times out, the processor can set a flag to mark the need to send a pulse to a motor, but it can fail to execute the necessary code to do so before the next timeout of the motor's timer. The processor has time to tally missed pulses: a record exists of the failure. During tracking, trying to "catch up" by sending extra pulses later to make up for pulses missed can have the negative consequence that they overtax the ability of the stepper motor to accelerate which can cause undetected lost pulses with loss of synchronism resulting in future irreversible metrological error. This happen because the mechanical state of the motor rotor gets out of synchronism with the digital image of its state by an unknown amount.

When the motors are only used to slew to a destination, missed pulses can be accounted for when slewing ends, by "walking" the motors to their correct destination to remedy the missing pulse defect. In this case, we are not interested in the path taken to reach the destination.

With the USBmP we tested, the communications from the host must be significantly less frequent than once a second. This interval of communication we have called a milestone interval. At the start of tracking, the milestone interval, determined by the host computer, is sent to the USBmP.

The expiration of each milestone is determined by the USBmP sidereal clock which is a timer register dedicated to this service and is controlled by a quartz crystal oscillator. When each milestone expires, the USBmP immediately captures the accrued stepper motor counts, which are translatable by the host into actuator lengths. These counts are sent to the host over the USB port.

The host sends the updated velocity/acceleration data to the USBmP over the USB link. This does not solve the problem of the USBmP receiving this data with unpredictable delay. We address this problem in the following way: The host is not sending real time motor pulse data to the USBmP, which would incorporate the latency error in pulse timing. In other words, it does not send positional data. If it sends instead velocity information, the USBmP numerically integrates the velocity with respect to time. The word 'integrate' here refers to an operation of the infinitesimal calculus with which engineers and astronomers will be familiar. If the updated velocity is late, the USBmP at least generated motor pulses at the old similar velocity. If the host sent not only velocity but also acceleration information as well, the USBmP could compute a reasonably close approximation to the next velocity and use it while waiting for the host to send the correct value.

The Mathematical Details of Circumventing Latency

The following will be understandable to those familiar with numerical analysis. The numbers actually sent to the USBmP we used are timer counts or inverse velocities. Without a divide instruction, the microprocessor could not compute counts from velocities much less accelerations. The host must do so. It is obvious that a sufficiently sophisticated processor can perform these operations. However, we found it surprising that the simple USBmP we used can make accurate predictions of timer counts over multiple milestone intervals given very sparse information supplied by the host.

We use the following method: At predetermined theoretical time intervals, typically 1 second, the host calculates a table, over more than one milestone, of unrounded timer counts for each stepper that will run it at the desired tracking rate. The host tabulates the differences of these successive tabular values and makes a table of these 'first' differences. The host differences the 'first' differences similarly and tabulates them as 'second' differences, and so on. It is well known property of polynomials of the $n^{th}$ order, its $n^{th}$ differences will be constant and the (n+1) order zero. A test of the timer counts computed at one second intervals show that they can be accurately represented by a polynomial of some low order like 3 or 4 over two milestone intervals each of 10 to 30 seconds.

For each timer, the host passes to the USBmP at each milestone, say 5 or 6 integers each of 16 bit precision. The last integer is a scaling factor S that may be a single byte. The other integers comprise the timer count and fixed point representations of its $1^{st}$, $2^{nd}$, 3rd . . . differences which the USBmP places in a buffer, one buffer for each motor. (A buffer is a segment of the USBmP random access memory [RAM] set aside for this data transfer process). The initial timer value is loaded into the timer register when the current count expires. At each second of time as counted by the USB sidereal clock timer, the USBmP is programmed to advance the line of differences in the buffer by:

replacing the $3^{rd}$ difference by the old $3^{rd}$ difference plus the $4^{th}$ difference shifted right with sign extension by S;

replacing the $2^{nd}$ difference by the old $2^{nd}$ difference plus the $3^{rd}$ difference shifted right with sign extension by S; and so on until the tabular value of the motor timer count is replaced.

This scheme, shown in FIG. 16, depicts the calculation for a typical stepper motor.

The host computer initially computes the theoretically correct timer counts shown as C0-C7 in FIG. 16 Table A as a function of time shown as integral seconds for one interval we termed a milestone above. (The values shown are examples and not requirements).

The host then constructs the pyramid of differences of Table A to yielding the third difference d0'''. (The use of $3^{rd}$ order differences is an example and not a requirement)

The host sets the third difference constant in Table A for all tabular times.

The host reverses the differencing by computing C4 as shown in bold type in Table B and continues procedure this for the entire milestone (calculations are not shown). It is well known that this constitutes a polynomial extrapolation based on some difference being a constant, d0''' in this case.

The host now adjusts the value of d0''' to make the extrapolated C7 (milestone end example) exactly equal to the C7 of Table A.

The host passes the line of differences for time 0 of the milestone to the USBmP which is programmed to reconstruct Table B. The data transmitted is shown in Table C of FIG. 16.

The quantities in the Table B calculation are typically 16 bit fixed point integers. The quantity S is a fixed-point scale difference (possibly=0) between the adjacent columns of differences.

C0 will be loaded at the next load of the motor timer register. If the motor is running at 100 pulses/second its timer will be loaded 100 times with the same number that will be updated every second in the above example of 1-second intervals between tabular values.

At the expiration of a milestone, after the latency delay, the host will send down three new buffers of data, one for each motor. They will seamlessly replace the numbers currently in the buffers. These buffers contain the parameters referred to in blocks, 1502, 1504, and 1506 of FIG. 15. The new velocity, or its counter equivalent, will be very close to the number that was in the buffer, by virtue of the accuracy of the polynomial interpolation of the USBmP. Hence, the velocity is very insensitive to the latency interval.

The only arithmetic ability of the USBmP required to do this is a single precision add and a sign extended right end-off shift. It is feasible to do with if the USBmP has only a single byte add instruction and a single step right rotate instruction and instructions to interrogate and set any bit of a byte.

We have given an example the use of $3^{th}$ order differences in FIG. 16. We may treat any order of differences as zero, if doing so achieves sufficient accuracy for the intended application. In particular we can treat the first differences as zero and use a constant velocity for the entire milestone if we are tolerant of the resulting inaccuracy.

There is a close parallel between the procedures described above and an established technique of numerical integration called predictor-corrector although it is commonly used for a different purpose of solving differential equations. Before the advent of computers and calculators, the prediction scheme based on a difference table using only addition of small integers was a considerable advantage in hand calculation. The novelty of the method described above is in the use of the predictor algorithm in an inexpensive microprocessor not required to be capable of anything but low precision addition and a sophisticated corrector in the host computer running under a multitasking operating system where communication between the two machines is hobbled by latency. This synergy overcomes the latency problems of the host multitasking system and the universal serial bus (USB).

The above method can fail under the following circumstance. To fix ideas suppose the USBmP computes new velocities every second from the line of differences it advances every second of real time. After a milestone interval of say 30 seconds, these numbers will be fairly accurate but not exactly correct. If during the second following the expiration of the last milestone the host sends the updated correct difference line, it will replace a line in current use that is a good approximation. However, if latency exceeded one second, the line of differences would pertain to the wrong second. In practice, the combined latency of the multitasking operating system we have tested (WindowsXP) and the USB channel, latency is much less than one second.

General Discussion of Tracking Related Topics and Comparison with the Prior Art

Tracking Through the Zenith

The mechanism of FIG. 1 and its embodiments can be used in conjunction with altazimuth-mounted telescopes to track stars through the zenith, which is a point of mathematical singularity with such mounts and a chronic nuisance with altazimuth mounts because diurnal motion can carry objects of interest through or near the zenith. Even with three controlled axes in professional altazimuth mounted telescopes, the zenith is a singular point. The celestial pole is also a singular point for equatorial mounts, but diurnal motion of stars is around the pole, never through it.

The severity of this problem can be seen by considering an altazimuth mount following the diurnal motion of an object near the zenith. The view field will rotate nearly 180 degrees and the azimuthal rotation is rapid and highly non-linear as the object passes the zenith point; close to it the azimuth axis will rotate rapidly as the zenith is passed. A camera rotator, if any, must rotate equally rapidly to remove this effect.

By contrast, any telescope mounted on the platform of the mechanism of FIG. 1 will track correctly without field rotation even if the object passes directly through the zenith point, because the pointing device geometry plays no role in the tracking geometry.

Tracking Proper Motion

Like all computer controlled astronomical telescope mounts, the mechanism of FIG. 1 provides for the removal of apparent diurnal motion of stars due to the rotation of the Earth. Without additional mechanism, it can also remove the motion of particular object relative to the stars, such as a comet at which the telescope may be aimed, provided an ephemeris of the object is available. The word 'track' in this sense means: There is a direction in space, fixed relatively to the moving stage, which remains pointed at the object of interest. Obviously, such tracking cannot remove the effect of rotation of the object itself. A telescope mounted on the stage will track the object if pointed in that direction but no linkage or transmittal of information between the telescope and the platform and its host computer is required for successful tracking. However, such communication is not precluded.

No Latitude Limitation

Unlike analog Dobsonian tracking platforms which provide similar functionality, generally with approximation, the mechanism of FIG. 1 will function without approximation at any latitude. The controlling digital devices of FIG. 1 embodiments must be supplied with the numerical value of the observing site latitude. In the above context, 'approximation' means the deliberate use of mathematical approximations or their analog equivalents, and not observational errors of calibration Freedom from Analog Mechanism Using a simpler mechanism than hexapod mounts, the FIG. 1 mechanism shares with hexapods freedom from analog mechanisms that emulate diurnal motion and spherical coordinates. Analog equatorial mounts conventionally used in astronomical telescopes remove the effect of rotation of earth using an analog of the Earth's rotation by rotating about a mechanical axis. Mounts with axes are mechanical analogs of spherical coordinate systems such as the altazimuth system, which can have mathematical singularities in the domain of interest, like the zenith. In our embodiments, and in hexapods, astronomical geometry is posited in algebra, which may be encoded in any of a variety of available digital devices.

The Use of Embodiments of FIG. 1 with Prior Art "GoTo" Capability

Computer controlled altazimuth mounted telescopes are sold in the amateur astronomical market usually with "go-to" capability: Once calibrated the telescope can be commanded to go to any object in an extensive database of interesting objects and track it. However, long exposure astrophotography is not possible with these instruments because of field rotation: Even though the pointing direction of the telescope optic axis remains pointed in the correct direction, the star field rotates about the pointing direction. This field rotation will not blur photographs with exposures of a fraction of a second of bright objects such as the Moon. However, most astronomically interesting objects are faint enough to require exposure times of minutes or hours that will result in blurring due to field rotation. The mechanism of FIG. 1, and particularly the embodiment shown in FIG. 4, can also be used as a tracking platform for these so-called "go-to" telescopes for astrophotography without field rotation. The altazimuth "go to" feature can be used to find the object, but the tracking feature of the "go-to" mount would not be used because doing so it would cause photographic field rotation.

Dobsonian mounted telescopes are appearing on the market with "go to" capability. When used in conjunction with an embodiment of FIG. 1, these telescopes would be capable of astrophotography of zenith transiting objects but not as they are sold. In principle all "go to" capability can be posited in a single host computer as described under Detailed description of the of the digital machinery above and shown in FIG. 5, box 503.

Integrated system: In principle, a "go-to" Dobsonian mounted on the embodiment shown in FIG. 2 or 3 would require only a simple USB microprocessor to handle the "go-to" functions which would still require motorized Dob axes and angle encoders. The advantage of such a system would be one capable of astrophotography with out restraints against observing near the zenith and with "go-to" capability all coordinated by a single PC laptop which could also provide star maps and ephemeris services.

Euler Angles

In the design of control software for the mechanism of FIG. 1 and its we have not found it necessary to use Euler Angles except as an artifice for certain calibrations. The linear actuators are themselves independent descriptors of the rotational degrees of freedom provided the design avoids certain mathematically singular configurations.

The Actuators are Analog Machines

Our embodiments share with all digitally controlled machines the limitations of accuracy imposed by the extent to which mathematically exact digital information can be translated into mechanical position.

Our embodiments and hexapods do not introduce additional error prone mechanisms such as axes of rotation intended to be orthogonal or to be an exact analog of some natural axis such as the polar axis of the Earth. Hexapods are commercially available with aiming error better than 1 arc-second. For high accuracy tracking, worm gear driven altazimuth or equatorial axes require periodic error calibration because these axes drive the telescope directly without intervening mechanical advantage. Our embodiments do not require periodic error correction when the micrometer barrels are driven by worm gears because the mechanical advantage between the worm and the stage is so great as to demagnify such error to insignificance. Our embodiments share with other devices performing similar functions the requirement of accurate timing. Clocks are analog machines, but inexpensive quartz crystal oscillator based timers can be highly stable, over the period of required tracking, making them amenable to precise calibration.

Linearly Scalable

Actuators using screw micrometers in our embodiments can achieve high accuracy at low cost. Unlike metrological micrometers, which have to conform to international length standards, the screws of actuators are only required to be of uniform pitch. For example, by making the screws of all three actuators from the same bar of precision rolled Acme threaded rod, high precision is possible at low cost. The calibration procedures described herein take advantage of the fact that the mechanism of FIGS. 1-3 are linearly scaleable. The tracking accuracy can be made just as great if the scale factor is 1.0000, 2.0000 or 1.0123. The screw pitch scale of a good metrological screw micrometer would have to be 1.0000 and not 1.0001 or 0.9999 in internationally recognized units, which imposes the stringent requirement of Bureau of Standards conformity that our embodiments do not have to meet.

Jerk Free Motion with Stepper Motor Drives

When stepper motors are use in this mechanism of FIG. 1 and its embodiments, it is easy to specify mechanical parameters that ensure that the movement of the telescope each step of any motor is much less than the resolving power of the telescope. This is true because of the large mechanical advantage afforded by worm or other gear or belt driven micrometer screws. Where stepper motors in the prior art have been used to drive the analog axes of altazimuth or equatorial mounts, even when the worm gears used having large numbers of teeth, the telescope moves in objectionable jerks because the angular motion of the telescope for each motor step is visible. Reduction gearing before the worm sufficient to provide smooth motion by reducing the jerk angle to the point of being imperceptible usually introduces objectionable gearbox backlash. Worm gears driven screws provide a large mechanical advantage between the worm and the stage so a small amount of backlash is tolerable when used with the mechanism of FIG. 1.

Spline Free Micrometer Screw Actuators

It is common practice in hexapod mounts that the actuators terminate in universal joints in which the outer yolks are rigidly attached to the base and stage. Motion of the stage will in general transmit rotary motion into the actuator spindle, but these actuators must have internal metrology, which is not affected by this rotation.

When micrometer screws are used with universal joints anchored to the base and stage as described in the preceding paragraph, this stage rotation will rotate the micrometer screw relative to the barrel, introducing metrological error unless the mechanism is designed to avoid such rotation.

It may therefore appear that when micrometer screws are used in actuators, a spline must be used to prevent inadvertent rotation of the screw relative to the micrometer barrel. Doing so would require a ball joint at either anchor-point of the actuator; alternatively, a universal joint could be used with a coaxial bearing to prevent stage rotation from being in conflict with the spline.

We claim that using a spline is expensive and less accurate than choosing rigidly connecting the outer U-joint yolks to the base and stage. Because of the astronomical requirement that the stage motion and position be known precisely, we submit that the most accurate and mechanically simple construction is the latter choice. However, the resulting error introduced by this choice must be removed mathematically. The price paid is that the mathematics is complex involving both the host computer and its interaction with the USBmP, which incurs the latency problem discussed above. However, once the code is written and debugged, the cost of its replication is negligible.

Removing Non-Linearity Error Due to Micrometer Screw Rotation when Avoiding Micrometer Splines We allow anchoring of the terminals of the actuators to be universal joints anchored to the base and stage as depicted in FIG. 18. We do not use splines or other methods to prevent rotation of the micrometer screw with respect to the gear driven barrel. We remove the errors of linearity mathematically by the host, which were introduced by allowing such rotation. In the interest of avoiding the use of an unnecessarily expensive processor, we do not do this removal with the USBmP. However, this calculation cannot be done on a motor step-by-step basis for the reason discussed above when multitasking operating systems controls the host computer. Interpolations between milestone points that are pre-computed by the host machine will take into account diurnal motion, ephemeris motion, if any, and changes in screw rotation, allowing us to run the actuator motors at USBmP predictable rates between milestones.

FIG. 18A shows a screw actuator with the U-joint pins of the stage and base parallel where we define the relative rotation of the stage with respect to the base as zero. FIG. 18 B shows the stage displaced by the action of other actuators, which generally tilts the actuator in question as shown. It also generally rotates the stage. This causes the screw to rotate unintentionally with respect to the barrel, as depicted by the jog in the centerline of FIG. 18B. This will happen whether or not the motorized barrel nut is rotated intentionally to change the actuator length, Engineers, with knowledge of three-dimensional vector geometry, will understand the following outline of the mathematical procedure of removing the error incurred by anchoring the universals to the base and stage, when screw actuators are used.

Set up a coordinate system in the base end of the actuator under consideration with the X axis of the system along the axis of the innermost yolk pin and the Z axis in the direction of the actuator vector. Because the actuator vector will be known in base coordinates, an algebraic matrix can be set up using two Euler angles representing rotation of the U-joint about its pin axes. The inner pin axis can thus be expressed in base coordinates after transformation by another matrix describing the orientation of the U-Joint because it need not be preferentially oriented with respect to the base coordinate system. The transformation between the base an stage coordinates will always be known in a calibrated system so the pin vector can be transformed to stage coordinates. Using the inverse of the procedure given above, the base pin vector can be transformed into a system in the stage inner yolk system in which its inner pin defines the X-axis and the jack vector the Z vector. This Z-axis is common to both the geometry of the base end of the screw micrometer and its stage end. If the base pin vector and the stage equivalent vectors are identical, by definition there will be no relative rotation of the screw and barrel of the micrometer. A jig can be used to ensure this condition obtains by setting the inter-pin distance of parallel pins when the actuator is assembled.

However, the dot product of these vectors will give the cosine of the rotation angle. Their cross product has the magnitude of the sine but its sign is indeterminate. Instead, the dot product of this cross product with the local system Z-axis unit vector will give the signed sine of the relative rotational angle. Because we also have the cosine, we can use the double argument arctangent to get the signed angle. We can do the cross product in a sense that gives a positive angle when the rotation will lengthen the micrometer, which will depend on the handedness of the screw.

The result of these operations is to give a correction to the calculation of all actuator lengths from stepper motor pulse tallies because they are functions of the stage position. We discussed earlier the method by which the USBmP can be supplied with a sparse data set that allows it to predict the combined effects of these functions of stage position:
 diurnal tracking;
 ephemeris motion, if any;
 screw rotation,
between milestone events in time that may be separated but tens of seconds during which time no communication from the host is necessary.

We claim:

1. A tracking mount for an astronomical telescope comprising
 (a) a motionless rigid base;
 (b) a movable rigid stage;
 (c) three anchor point pairs, wherein one point of each said anchor point pair is fixed in
 relationship to said base and the other point of each said anchor point pair is fixed in relationship
 to said stage;
 (d) three actuators, wherein each said actuator varies the distance between the points of
 each said anchor point pair;
 (e) a passive device, wherein said passive device constrains movement of said stage in such
 a way that a single fixed point on the base and a single fixed point on the stage are held in
 coincidence, wherein said passive device does not constrain angular motion of said stage
 relative to said base about said fixed point;
 wherein lines drawn between respective said anchor point pairs consist of three substantially
 orthogonal lines, being oriented along three mutually orthogonal edges of a cube in such a
 way that no two lines share the same cube face;
 whereby said stage can move in such a way so as to track celestial bodies.

2. A tracking mount for an astronomical telescope comprising
 (a) a motionless rigid base;
 (b) a movable rigid stage;
 (c) three anchor point pairs, wherein one point of each said anchor point pair is fixed in
 relationship to said base and the other point of said anchor point pair is fixed in relationship
 to said stage;
 (d) three actuators, wherein each said actuator varies the distance between the points of
 each said anchor point pair;
 (e) a passive device, wherein said passive device constrains movement of said stage in such
 a way that a single fixed point on the base and a single fixed point on the stage are held in
 coincidence, wherein said passive device does not constrain angular motion of said stage
 relative to said base about said fixed point;
 wherein lines drawn between respective said anchor point pairs consist of two substantially
 parallel lines and a third line which is substantially orthogonal to the first two lines;
 whereby said stage can move in such a way so as to track celestial bodies.

3. The method of calibration of the tracking mount of claim 1 or 2,
 wherein said tracking mount is used to determine the azimuth of true north in the system, coordinates by observing two known stars differing in altitude using a procedure selected from a group consisting of
 (a) finding said azimuth of true north satisfying the mathematical identity involving only the azimuth of true north and having only one solution;
 (b) slewing to a second of said two known stars using an approximate azimuth and by varying the approximation to make the telescope aim approach closest to said second star, yielding the azimuth of true north.

4. The method of calibration of the tracking mount of claim 1 or 2,
 wherein said tracking mount is used to determine corrections to the zero point lengths of two of said actuators when a stage spirit level indicates level, thereby ensuring the nominally horizontal plane of said stage coordinate system is exactly level when said stage spirit level indicates level.

5. The method of calibration of the tracking mount of claim 1 or 2,
 wherein said tracking mount is used to determine, using a plurality of stars, corrections to data base values of said anchor points.

6. The tracking mount of claim 1 or 2, wherein said actuator are screws and said anchor points are defined by two-axis gimbals or universal joints, an outer yoke of said anchor point rigidly attached to said base and said stage.

7. The tracking mount of claim 1 or 2,
 wherein said tracking mount shunts gravitationally induced forces from said stage to said base using one or more substantially frictionless mechanisms selected from a group consisting of
 (a) springs of predetermined lengths and spring constants on the vertices of a single polygon where a certain destabilizing rotary torque resulting from the use of a single polygonal arrangement is not problematic;
 (b) springs of predetermined length and spring constants on the vertices of two polygons.

8. The method of circumventing computer latency for said tracking mount of claim 1 or 2,
 wherein said actuators are driven by stepper motors, by positing the tracking geometry of celestial bodies only in a general purpose computer running under control of a multitasking operating system, wherein
 (a) communications via a Universal Serial Bus (USB) cable terminating in a microprocessor designed for USB service, which controls said stepper motors,
 (b) said USB microprocessor comprising, machine instructions to perform fixed point addition and shifting of single byte integers, single bit testing and single byte Boolean operations, performs interpolation by advancing lines of central differences, wherein the disparity between a new line of difference and a current line being advanced by said USB microprocessor is insignificant, when the disparity is caused by uncertainty in the time of arrival of the new line of differences due to latency arising from the multitasking operating system of said general purpose computer and latency of said USB channel.

* * * * *